United States Patent
Oohama et al.

[11] Patent Number: 6,116,708
[45] Date of Patent: *Sep. 12, 2000

[54] RECORDING SYSTEMS AND RECORDING UNITS EMPLOYED IN THE RECORDING SYSTEMS

[75] Inventors: Satoshi Oohama; Naoki Kawawada; Tadao Iwaki; Tatsuru Sato; Kouji Kawaguchi; Seiji Kuwabara; Hiroshi Okano, all of Chiba, Japan

[73] Assignee: Seiko Instruments Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/928,710

[22] Filed: Sep. 12, 1997

[30] Foreign Application Priority Data

Sep. 13, 1996 [JP] Japan ..................... 8-243805

[51] Int. Cl.[7] ................................. H04N 1/034
[52] U.S. Cl. ................................. 347/3; 347/51
[58] Field of Search ........................... 347/51, 3

[56] References Cited

U.S. PATENT DOCUMENTS

| | | | |
|---|---|---|---|
| 3,056,136 | 8/1962 | Macgriff | 347/124 |
| 3,480,962 | 11/1969 | Weigi et al. | 347/3 |
| 3,484,162 | 12/1969 | Clark . | |
| 3,798,365 | 3/1974 | Browning et al. | 358/96 |
| 4,321,627 | 3/1982 | Hooker, III et al. | 358/286 |
| 4,794,463 | 12/1988 | Tamura et al. | 358/296 |
| 4,810,614 | 3/1989 | Sangyoji et al. | 430/138 |

FOREIGN PATENT DOCUMENTS

| | | |
|---|---|---|
| 241118A1 | 10/1987 | European Pat. Off. . |
| 700787A1 | 3/1996 | European Pat. Off. . |

OTHER PUBLICATIONS

Patent Abstracts of Japan, vol. 008, No. 058 (P–261), Mar. 16, 1984 and JP 58 207058, Dec. 2, 1983.
Patent Abstracts of Japan, vol. 014, No. 159 (M–0956), Mar. 28, 1990 and JP 02 022065, Jan. 24, 1990.
Patent Abstracts of Japan, vol. 007, No. 177 (M–233), Aug. 5, 1983 and JP 58 081171, May 16, 1983.
Patent Abstracts of Japan, vol. 011, No. 391 (P–649), Dec. 22, 1987 and JP 62 156674, Jul. 11, 1987.
Patent Abstracts of Japan, vol. 017, No. 623 (M–1511), Nov. 17, 1993 and JP 05 193135, Aug 3, 1993.

*Primary Examiner*—Arthur T. Grimley
*Assistant Examiner*—Greg Moldafsky
*Attorney, Agent, or Firm*—Adams & Wilks

[57] ABSTRACT

A recording unit has an illuminating device for projecting light on an original to form an original image, and an optical device which focuses the original image formed by the illuminating device. A light control plate has a slit for allowing a portion of the original image focused by the optical device to pass through. The light which passes through the slit of the light control plate is guided onto a print head which ejects ink on a recording medium when exposed to the light.

12 Claims, 14 Drawing Sheets

FIG. 6
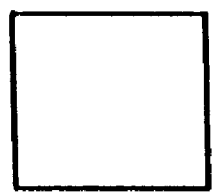
15
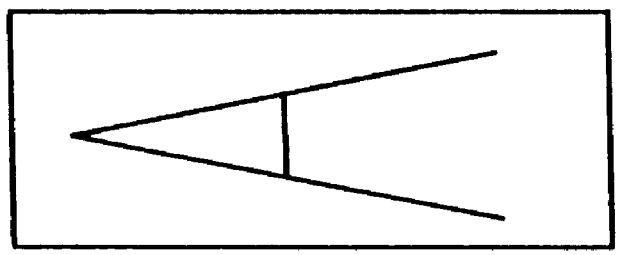
16
17
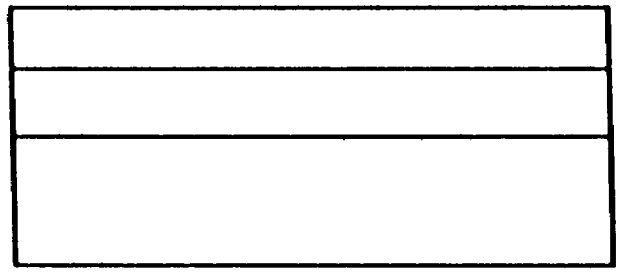
18
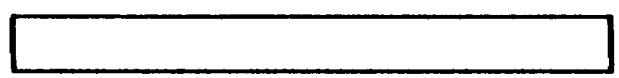
10

F I G. 1 1
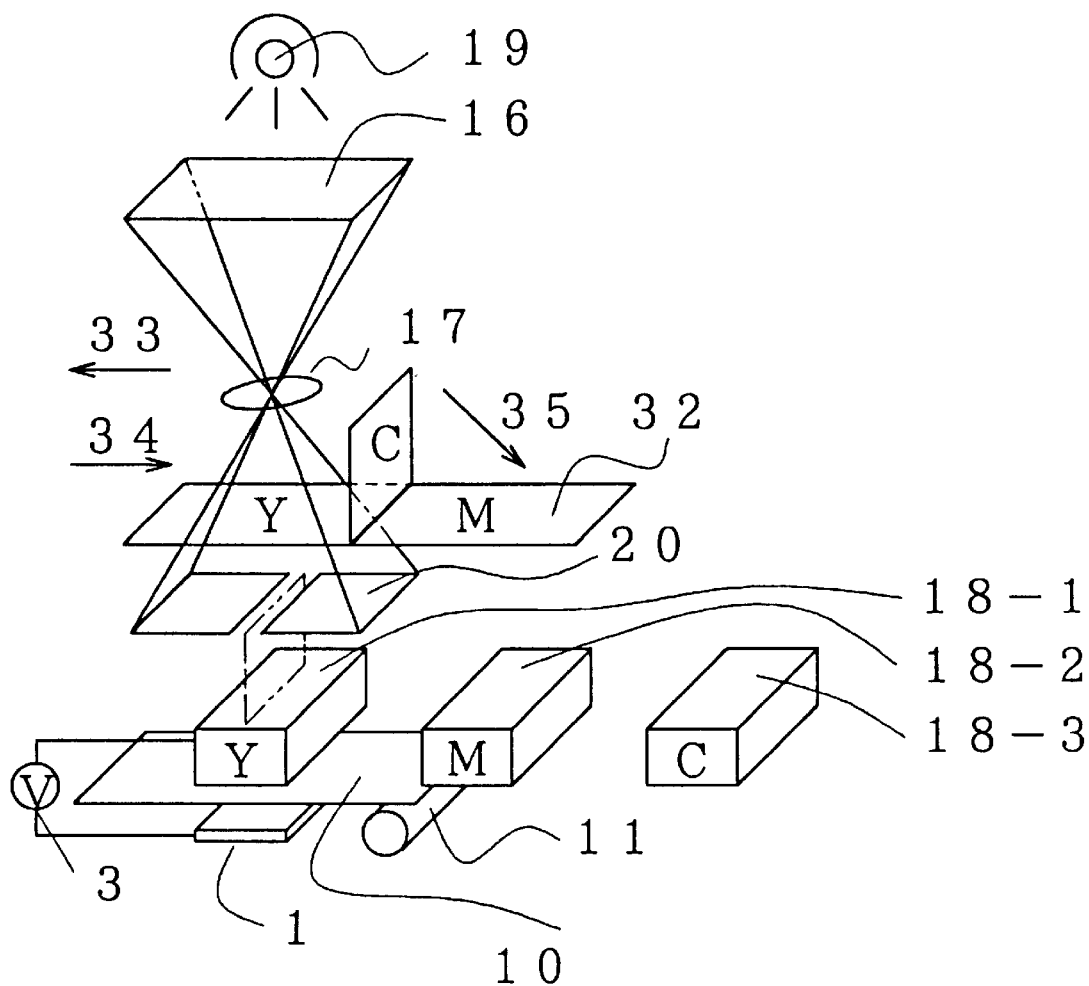

RECORDING SYSTEMS AND RECORDING UNITS EMPLOYED IN THE RECORDING SYSTEMS

BACKGROUND OF THE INVENTION

The present invention relates to recording systems and recording units employed in the recording systems for obtaining output images on recording paper that can meet a wide variety of needs in the printing industry in which high-speed output of high-quality images is required, in the printer industry oriented toward office and personal use requirements, and in the commercial equipment industry demanding inexpensive, general-purpose output devices which utilize versatile types of recording paper.

One known example of conventional color copying machines is a system shown in FIG. 16, which is based on color copying technology utilizing an electrophotographic process. According to this method, a DC-driven corona charger 102 uniformly places a positive electric charge by corona discharge on a surface of a photosensitive drum 101 in a case where the photosensitive drum 101 is formed of a p-type semiconductor, such as amorphous selenium or an amorphous selenium-tellurium alloy, for example. Then, a light beam produced by an exposure lamp 117 scans across a document glass plate 115, reflected light is passed through a filter 103 and a lens 104 to form an optical recording image in a color complementary to red, for example, and this optical recording image is projected onto the photosensitive drum 101 to form thereon an electrostatic latent image in the complementary color of red. This electrostatic latent image is developed into a visual image in red by a red toner developing unit 105.

Next, the electrostatic charge on the surface of the photosensitive drum 101 is eliminated by an AC-driven corona charge eliminating charger 113 and the photosensitive drum 101 is idled with a transfer charger 106, an AC-driven separation corona charger 107 and a cleaning blade unit 108 set in an OFF state. The DC-driven corona charger 102 places again a positive electric charge on the surface of the photosensitive drum 101, an electrostatic latent image is formed by an optical recording image in a color complementary to yellow, and a visual image in yellow is developed by a yellow toner developing unit 109. Lastly, an optical recording image in a color complementary to blue is projected and a blue toner developing unit 110 develops a visual image in blue in a similar way. At this point, the photosensitive drum 101 carries on its surface a full-color visual image composed of red, yellow and blue components. Subsequently, the transfer charger 106 causes the full-color image to be transferred onto a recording medium 111 such as recording paper and the AC-driven separation corona charger 107 peel the recording medium 111 off the photosensitive drum 101. The recording medium 111 thus separated is passed through a thermal fixing unit 112 to produce a permanently fixed image and delivered onto an output tray 116. On the other hand, the electrostatic charge on residual toner left on the surface of the photosensitive drum 101 is eliminated by the AC-driven corona charge eliminating charger 113, and the photosensitive drum 101 is cleaned by the cleaning blade unit 108. Further, residual charges left on the surface of the photosensitive drum 101 are removed by an erase lamp 114 in preparation for a succeeding color copying cycle.

Problems that have been encountered with the color copying technology based on the conventional electrophotographic approach are as follows:

(1) There are so many processing steps in the printing operation that it is difficult to reduce the physical size of a system.

(2) Since images in different colors are overlaid with one another on a single photosensitive drum, image misalignment and mixing of the different colors can occur.

Although copying machines based on ink-jet recording technology which can solve problem (1) of the aforementioned electrophotographic approach are available, the conventional ink-jet recording technology has been associated with the following problems:

(1) It is difficult to improve image resolution since a nozzle is used for spraying ink.

(2) The ink-jet recording technology can be divided into two types; these are continuous type and on-demand type. The continuous type provides a high recording speed, but system simplification is difficult due to the need for recovering unused ink. Contrarily, although system construction is simplified in the on-demand type, it is difficult to achieve a high recording speed.

SUMMARY OF THE INVENTION

It is therefore an object of the invention to provide recording units which are capable of producing high-resolution, high-quality printouts at a high speed on recording media of arbitrary forms without mechanical contact as well as recording systems employing such recording units.

To solve the aforementioned problems, a recording unit of the invention employs a construction comprising at least original image illuminating means for projecting light on an original to obtain an original image, optical means, and a print head which squirts ink when exposed to light, wherein the optical means guides the light incident from the original image illuminating means onto the print head.

In another construction, a recording unit of the invention comprises entire original image illuminating means for projecting light on the whole of an original to obtain an original image, optical means for focusing the original image obtained by the entire original image illuminating means, a light control plate having a slit for controlling a light transmitting area which allows a portion of the original image focused by the optical means to pass through, and a print head which squirts ink when exposed to light, wherein the light which has passed through the light control plate is guided onto the print head.

In still another construction, a recording unit of the invention comprises slitlike original image illuminating means for projecting light on a slitlike portion of an original to obtain an original image, optical means for focusing the original image obtained by the slitlike original image illuminating means, a print head which squirts ink when exposed to light, wherein the light focused by the optical means is guided onto the print head.

In yet another construction, a recording unit of the invention comprises original image illuminating means for projecting light on an original to obtain an original image, optical means for focusing the original image obtained by the original image illuminating means, optical sensing means for detecting light of the original image focused by the optical means and performing photoelectric conversion, light projecting means for projecting light based on an output signal of the optical sensing means, and a print head which squirts ink in accordance with the light incident from the light projecting means.

A recording unit of the invention capable of outputting color image pixels employs a construction comprising original image illuminating means for projecting light on an original to obtain an original image, optical means for focusing the original image obtained by the original image illuminating means, color separation means for separating light from the original image or a focused light thereof into different colors, and print heads which squirt inks when exposed to light, the print heads being provided at least with such inks that correspond to the colors separated by the color separation means, wherein individual portions of light separated by the color separation means are guided onto the print heads corresponding to those separated portions of light.

A recording system of the invention employs a construction comprising at least one of the above-described recording units, paper feeding means for feeding recording paper to the print head, an image processing circuit for processing image data, and a controller for controlling the recording unit, the paper feeding means and the image processing circuit.

Before describing modes of working of recording units and recording systems of the present invention, constructions of print heads used in the recording units and the recording systems as well as constructions of text/graphics printing units employing the print heads are explained.

<Description of the Constructions of Text/Graphics Printing Units>

A first construction of a text/graphics printing unit comprises a print head composed of a transparent electrode formed on a transparent substrate, a photoconductive film formed on the transparent electrode and means for feeding ink onto the photoconductive film, a facing electrode located with a sufficient clearance kept from the means for feeding the ink to allow recording paper to be inserted, and a power source for applying a voltage between the transparent electrode and the facing electrode.

FIG. 1 is a diagram showing one embodiment of the first construction of the text/graphics printing unit. Referring to FIG. 1, the power source 3 applies a voltage between the transparent electrode 2 (the transparent substrate is not illustrated) and the facing electrode 1, and light 5 is projected in the direction of an arrow 7 from behind the transparent electrode 2 onto the photoconductive film 4 in this condition. As a result, the resistance of the photoconductive film 4 drops in its illuminated area, causing a photoelectric current to flow through the illuminated area. Then, the illuminated area of the photoconductive film 4 electrically conducts and establishes a channel between the facing electrode 1 and the transparent electrode 2. As an electric charge accumulates in ink 6 existing within the illuminated area of the photoconductive film 4, the ink 6 is squirted toward the facing electrode 1 due to the Coulomb force.

Materials usable for forming the photoconductive film 4 include inorganic photoconductors such as photoconductive monocrystal substances consisting essentially of selenium (Se), cadmium sulfide (CdS) or zinc oxide (ZnO) or BSO ($Bi_{12}SiO_{20}$), i-type, pi-type or pin-type hydrogenated amorphous silicon, and layer-built organic photoconductors based on CTL/CGL or CTL/CGG structure, for instance. What is important for the photoconductive film 4 is its photoconductivity, and it is preferable that a reduction in incident light intensity causes a large variation in surface potential. The aforementioned inorganic photoconductors and organic photoconductors have dark resistivity ranging from $10^9$ to $10^{14}$ Ωcm. When the photoconductive film 4 is illuminated, its resistivity drops to a range of $10^6$ to $10^{11}$ Ωcm so that the photoelectric current flows through the illuminated area. Needless to say, the resistivity of the photoconductive film 4 and variation in its resistivity caused by exposure to light differ depending on used materials and the construction of the photoconductive film 4. It is preferable that the photoconductive film 4 has a thickness between 10 and 50 μm. Regarding electrical characteristics, it is required that the photoconductive film 4 has high resistivity in dark places and has high sensitivity and high-speed response to incident light. These requirements are satisfied by the aforementioned photoconductors.

In a case where hydrogenated amorphous silicon is used for forming the photoconductive film 4, its dark resistivity ranges from $10^9$ to $10^{11}$ Ωcm and the resistivity can drop to a range of $10^4$ to $10^6$ Ωcm when the photoconductive film 4 is illuminated. It is therefore possible to achieve a large variation in surface potential. While it goes without saying that the dark resistivity of the photoconductive film 4 increases with an increase in its thickness, the film thickness should be 50 μm or less, preferably between about 20 to 30 μm. This is because resolution drops at thicknesses beyond a range of 20 to 100 μm. It is preferable to use i-type hydrogenated amorphous silicon, from which impurity elements have been removed, in order to attain high dark resistivity and achieve high-resolution squirting of ink by minimizing the spreading of electric charge in directions parallel to the surface of the photoconductive film 4.

In this embodiment, the electric charge is placed to the ink 6 by illuminating the photoconductive film 4, and the amount of this electric charge is determined by the diameter of a projected light beam, projected light intensity and pulse width of the projected light. The larger the diameter of the projected light beam, the larger the aforementioned illuminated area of the photoconductive film 4, resulting in an increase in the amount of accumulated electric charge. Also, an increase in the projected light intensity causes a greater resistivity decrease in the photoconductive film 4. This enables the photoelectric current to more easily flow through the photoconductive film 4, resulting in an increase in the amount of accumulated charge. The amount of accumulated charge can also be increased by increasing the pulse width of the projected light.

In the text/graphics printing unit of the invention, it is possible to achieve a high ink squirting speed by controlling the amount of electric charge accumulated in the ink 6. It is also possible to vary the ink squirting speed depending on the type of recording medium.

Materials usable for forming the transparent electrode 2 include indium tin oxide (ITO), electrically conductive polymers, a thin metallic film which is sufficiently thin to allow light of pass through (e.g., a thin aluminum film having a thickness of 0.0 μm), as well as zinc oxide (ZnO), tin oxide ($SnO_2$) and a compound thereof. Materials usable for forming the facing electrode 1 include high-conductivity metal materials, such as aluminum, copper and gold.

The source voltage applied between the transparent electrode 2 and the facing electrode 1 falls within a range of 500 V to 4 kV. An appropriate level of the applied voltage varies depending on such factors as the electric conductivity of the ink 6, the material used in the photoconductive film 4, and the distance between the transparent electrode 2 and the facing electrode 1. Although it is needless to say, at least theoretically, that reversal of polarity of the power source 3 does not cause any effects, the facing electrode 1 should preferably be used as a positive electrode. This is because many types of ink are inclined to be charged negatively, rather than positively.

Future advances in materials used in individual constituent components may make it possible to use a source voltage of 50 V or less. Accordingly, the source voltage used in this text/graphics printing unit is not limited to the range of 500 V to 4 kV.

Although a semiconductor laser is used as a light source of the light 5, the light source is not limited thereto as long as it can emit light compatible with the optical wavelength of the photoconductive film 4. A helium-neon laser, a semiconductor laser array, a light emitting diode (LED) array and a halogen lamp, for example, are also well suited for use as the light source.

Physical properties of the ink 6 that are influential on the ink squirting ability include surface tension, viscosity and electric conductivity. Provided that the electric conductivity and viscosity are constant, the surface tension and a maximum squirting distance of the ink 6 (this distance is hereinafter referred to as the maximum recordable distance) has the following relation: the maximum recordable distance increases as the surface tension decreases within a surface tension range of 20 to 50 dyn/cm. It would be understood that the smaller the surface tension, the smaller the resisting force exerted in an ink squirting process. This means that it is possible to eject a stream of ink even with a weak electric field so that the maximum recordable distance can be increased with smaller surface tension levels. Generally, water-based ink has a higher surface tension. Compared to the surface tension of pure water, which is 72.8 dyn/cm at 20° C., the surface tension of organic solvents ranges from 20 dyn/cm to 35 dyn/cm. Ink produced by dissolving a dye in an organic solvent is suited for used as the ink 6. Further, it is possible to increase the maximum recordable distance of the ink 6 by improving its surface tension. More specifically, this is achieved by solving such surface-active agent as an anionic surface-active agent, a cationic surface-active agent, or a nonionic surface-active agent in the ink 6.

While the viscosity of ink solvent can be chosen from a wide range, a solvent having a low viscosity results in poor shelf stability. To ensure acceptable shelf stability, a solvent having a boiling point of 200° C or above should therefore be selected. Provided that the surface tension and electric conductivity are constant, the viscosity and the maximum recordable distance has the following relation: the maximum recordable distance increases as the viscosity decreases. Accordingly, the resisting force exerted in the ink squirting process decreases, making it possible to increase the maximum recordable distance, when the viscosity is low in a similar way to what has been discussed with regard to the surface tension.

It is preferable that the electric conductivity of the ink 6 is low as it is necessary to place an electric charge from the photoconductive film 4 to the ink 6 for squirting the ink 6. If, however, the electric conductivity is too low, the electric charge accumulated in the ink 6 dissipates within the ink 6 before the electric charge reaches an ink meniscus at the forward end, making it impossible to eject a burst of ink. The electric conductivity of the ink 6 is therefore set to $2 \times 10^{-7}$ or less.

Needless to say, optimum ranges of ink properties, such as the surface tension, viscosity and electric conductivity, are not limited to the aforementioned settings. This is because characteristics of the light source of the light 5, the voltage applied between the transparent electrode 2 and the facing electrode 1, the distance between the transparent electrode 2 and the facing electrode 1, and the width of a slit of a later-described slit plate 8 also determines whether the burst of ink can be successfully ejected.

A second construction of a text/graphics printing unit comprises a print head composed of a transparent electrode formed on a transparent substrate, a photoconductive film formed on the transparent electrode, means for feeding ink onto the photoconductive film and a slit plate having a slit for controlling a burst of ink, a facing electrode located with a sufficient clearance kept from the means for feeding the ink to allow recording paper to be inserted, and a power source for applying a voltage between the transparent electrode and the facing electrode.

FIG. 2 is a diagram showing one embodiment of the second construction of the text/graphics printing unit. Referring to FIG. 2, the power source 3 applies a voltage between the transparent electrode 2 and the facing electrode 1, and light 5 is projected in the direction of an arrow 7 from behind the transparent electrode 2 onto the photoconductive film 4 in this condition. As a result, the resistance of the photoconductive film 4 drops in its illuminated area, causing a photoelectric current to flow through the illuminated area. Then, the illuminated area of the photoconductive film 4 electrically conducts and establishes a channel between the facing electrode 1 and the transparent electrode 2. As an electric charge accumulates in ink 6 on the photoconductive film 4, the ink 6 is squirted toward the facing electrode 1 due to the Coulomb force, in which the amount of ink and its squirting direction is controlled by the slitplate 8. In this ink squirting process, the width of the slit formed in the slit plate 8 determines a maximum value of static ink pressure at an ink nozzle, while the ink 6 under the static pressure forms a semilunar protruding surface, or a meniscus, at the ink nozzle and this determines the amount of ink supply. A reduction in the slit width results in a reduction in the curvature of the meniscus and a consequent increase in the Coulomb force which causes a burst of the ink 6. This means that the recording performance is improved as the slit width becomes smaller. Accordingly, the width of the slit formed in the slit plate 8 should preferably be about 100 $\mu$m or less, at which the ink 6 can be supplied without problems. Should the ink 6 spill over the slit plate 8, the spilled ink 6 would leap toward the facing electrode 1, and it would become difficult to further form desired image pixels. It is therefore required to use a material having a large contact angle against the ink 6 and dielectric properties for forming the slit plate 8. It is possible to achieve a proper contact angle and prevent the aforementioned erratic phenomenon at an appropriate static pressure of the ink 6 by using a fluororesin for producing the slit plate 8, or by treating the surface of the slit plate 8 formed of glass or ceramics by the use of a silane coupling agent. Furthermore, provision of the slit plate 8 makes it possible to control the squirting direction of the ink 6 and stabilize the amount of squirted ink and the ink squirting speed. Moreover, concentrating efficiency of the ink 6 can be increased and energy required for producing a burst of ink can be saved by controlling the curvature of the meniscus.

A third construction of a text/graphics printing unit comprises a print head composed of a transparent electrode formed on a transparent substrate, a photoconductive film mounted on the transparent electrode, the photoconductive film having a projection formed of a wall for controlling a burst of ink and means for feeding ink into the projection on the photoconductive film, a facing electrode located with a sufficient clearance kept from a foremost end of the projection to allow recording paper to be inserted, and a power source for applying a voltage between the transparent electrode and the facing electrode.

FIG. 3 is a diagram showing one embodiment of the third construction of the text/graphics printing unit. Referring to FIG. 3, the power source 3 applies a voltage between the transparent electrode 2 and the facing electrode 1, and light 5 is projected in the direction of an arrow 7 from behind the transparent electrode 2 onto an area corresponding to the projection of the photoconductive film 9 in this condition. As a result, the resistance of the photoconductive film 9 having the projection drops in its illuminated area, causing a photoelectric current to flow through the illuminated area. Then, the illuminated area of the photoconductive film 9 having the projection electrically conducts and establishes a channel between the facing electrode 1 and the transparent electrode 2. As an electric charge accumulates in ink 6 existing within the projection of the photoconductive film 9, the ink 6 is squirted toward the facing electrode 1 due to the Coulomb force, in which the amount of ink and its squirting direction is controlled by the projection formed on the photoconductive film 9. In this ink squirting process, the projection formed on the photoconductive film 9 plays the same role as the aforementioned second construction of the text/graphics printing unit. The projection integrally formed on the photoconductive film 9 can serve the same function as the slit plate 8 described above, and this arrangement enables reductions in production costs and physical size. It is preferable that the projection on the photoconductive film is formed of a dielectric material as is the case with the aforementioned slit plate 8.

A text/graphics printing unit of a fourth construction comprises ink accelerating means for accelerating squirted ink in addition to the provision of the text/graphics printing unit of the already described first, second or third construction.

FIG. 4 is a diagram showing one embodiment of the fourth construction of the text/graphics printing unit. Referring to FIG. 4, the power source 3 applies a voltage between the transparent electrode 2 and the facing electrode 1, and light 5 is projected in the direction of an arrow 7 from behind the transparent electrode 2 onto the photoconductive film 4 in this condition. As a result, the resistance of the photoconductive film 4 drops in its illuminated area, causing a photoelectric current to flow through the illuminated area. Then, the illuminated area of the photoconductive film 4 electrically conducts and establishes a channel between the facing electrode 1 and the transparent electrode 2. As an electric charge accumulates in ink 6 on the photoconductive film 4, the ink 6 is squirted in the direction of an arrow 13 due to the Coulomb force and then accelerated by accelerating means 14 toward the facing electrode 1. The accelerating means 14 of this embodiment serves to increase the speed of squirted ink 12. In addition, the amount of energy supplied to the photoconductive film 4 can be reduced by controlling the voltage applied for squirting the ink 6 and input light energy. The accelerating means 14 may be formed of a material having good electrical conductivity, such as aluminum, copper or gold, a capacitor composed of a pair of flat plates, or a cylindrical-shaped or other tubular object having a closed end. In this embodiment, a voltage is applied to the accelerating means 14 from a terminal of the power source 3 that is connected to the facing electrode 1 via a resistor. The arrangement for applying the voltage to the accelerating means 14 is not limited to this, however. As an example, the electric potential difference between the transparent electrode 2 and the accelerating means 14 may be made larger than that between the transparent electrode 2 and the facing electrode 1. An actual arrangement is determined depending on the amount of the squirted ink 12 and the distance between the accelerating means 14 and the ink 6, for example. It is also possible to squirt the ink 6 by using the accelerating means 14 alone if there is made provision for switching the facing electrode 1 as shown in FIG. 4. This configuration makes it possible to form the text/graphics printing unit of this embodiment as a single-piece, compact element. Furthermore, as no voltage is applied to the facing electrode 1 in this alternative configuration, it is possible to prevent such a phenomenon that recording paper 10 is attracted by an electrostatic force, and the level of torque exerted by paper feeding means 11 can be reduced.

A fifth construction of a text/graphics printing unit is same as the text/graphics printing units of the first to fourth constructions except that its print head and the text/graphics printing unit itself are formed into linear shapes of a width corresponding to the printing width of recording paper.

FIG. 5 is a diagram showing one embodiment of the fifth construction of the text/graphics printing unit. Referring to FIG. 5, the power source 3 applies a voltage between the transparent electrode 2 and the facing electrode 1, and light 5 is projected in a linear pattern in the direction of an arrow 7 from behind the transparent electrode 2 onto the photoconductive film 4 in this condition. As a result, the resistance of the photoconductive film 4 drops in its illuminated area, causing a photoelectric current to flow through the illuminated area. Then, the illuminated area of the photoconductive film 4 electrically conducts and establishes a channel between the facing electrode 1 and the transparent electrode 2. As an electric charge accumulates in ink 6 on the photoconductive film 4, the ink 6 is squirted toward the facing electrode 1 due to the Coulomb force.

The print heads and the text/graphics printing units of the first to fourth constructions are reconfigured into the linear shapes to adapt them to the text/graphics printing unit of this embodiment. With this arrangement, the printable width matches the size of the recording paper and the recording speed is remarkably increased, enabling high-speed printing.

In the fifth construction of the text/graphics printing unit, the slit in the slit plate 8 of the second construction, the projection of the third construction or the accelerating means of the fourth construction, whichever applicable, is formed to have an adequate length to produce the linear light-projecting pattern.

Recording units and recording systems of the invention employing the text/graphics printing units of the aforementioned constructions are now described below with reference to modes of carrying out the invention and embodiments thereof. It is to be noted, however, that usable print heads and text/graphics printing units are not limited to those cited in the following modes of carrying out the invention and the embodiments, but any of the aforementioned constructions may be employed.

<Modes of Working of Recording Units>

Modes of working of recording units of the present invention are now described below.

Each of the recording units of the invention comprises original image illuminating means for projecting light on an object to be recorded (or the original) to obtain its optical image, optical means, and a print head which ejects a burst of ink when exposed to light, wherein the optical image of the original is guided onto the print head.

FIG. 6 is a diagram showing the mode of working of a recording unit of the invention.

Referring to FIG. 6, image pixels of the original 16 are illuminated as the original image illuminating means 15 projects light on the original 16. The image of the original illuminated by the original image illuminating means is focused by the optical means 17 and projected on the print head 18. An unillustrated power source applies a voltage set to a proper level to the print head 18, and projected light intensity is set to an appropriate level. The print head 18 causes only such portion of ink that exists in its illuminated area, which corresponds to the original image, to be ejected by the above-described print head ink squirting process. The original image is reproduced as the ink is absorbed by recording paper 10 and fixes thereto.

A halogen lamp can be used as the original image illuminating means 15 of this invention to emit light onto the original 16 and then project the obtained original image onto the print head 18. Electrical resistance drops in only the illuminated area of the print head 18.

Needless to say, it is possible to use other types of light source than the halogen lamp provided that the wave length of the light source is matched to the absorption coefficient of the print head 18 to that wave length.

Since the light corresponding to the original image is projected on the print head 18 by the original image illuminating means 15, the recording process employed in the recording unit of this invention is of a non-contact type and capable of high-speed processing.

It is needless to say that the print head 18 employed in the recording unit may be any of the print heads or the text/graphics printing units of the aforementioned constructions.

BRIEF DESCRIPTION OF THE DRAWINGS

FIG. 6 is a diagram showing mode of working of a recording unit of the invention;

FIG. 11 is a diagram showing one embodiment of a first construction of a color recording unit of the invention;

DETAILED DESCRIPTION OF THE PREFERRED EMBODIMENTS

The recording units of the invention and the recording systems employing the recording units are now described in specific detail below.

<Embodiment 1>

A first construction of a recording unit of the invention comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, and a print head which ejects a burst of ink when exposed to light.

Figure 1:
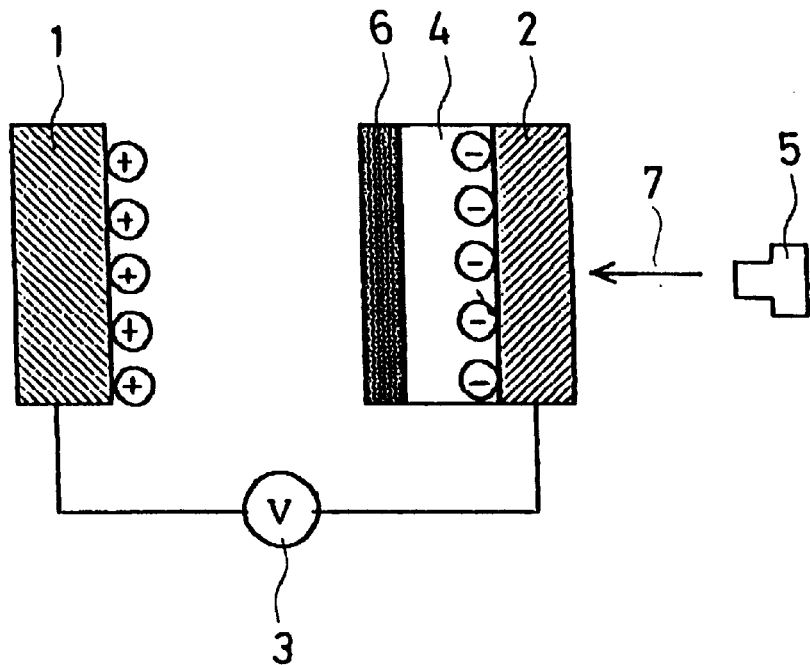
FIG. 1 is a diagram showing one embodiment of a first construction of a text/graphics printing unit used in a recording unit of the invention.
Figure 2:
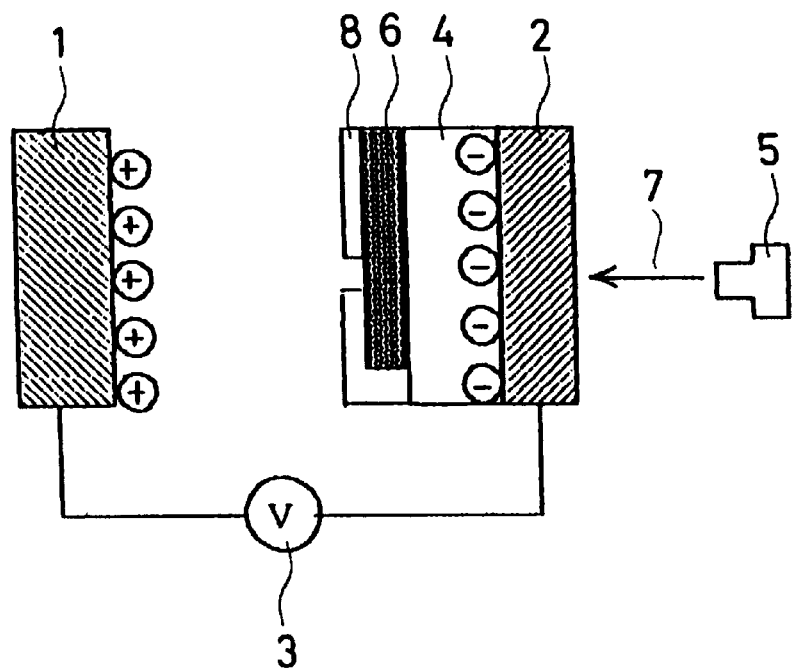
FIG. 2 is a diagram showing one embodiment of a second construction of a text/graphics printing unit used in a recording unit of the invention.
Figure 3:
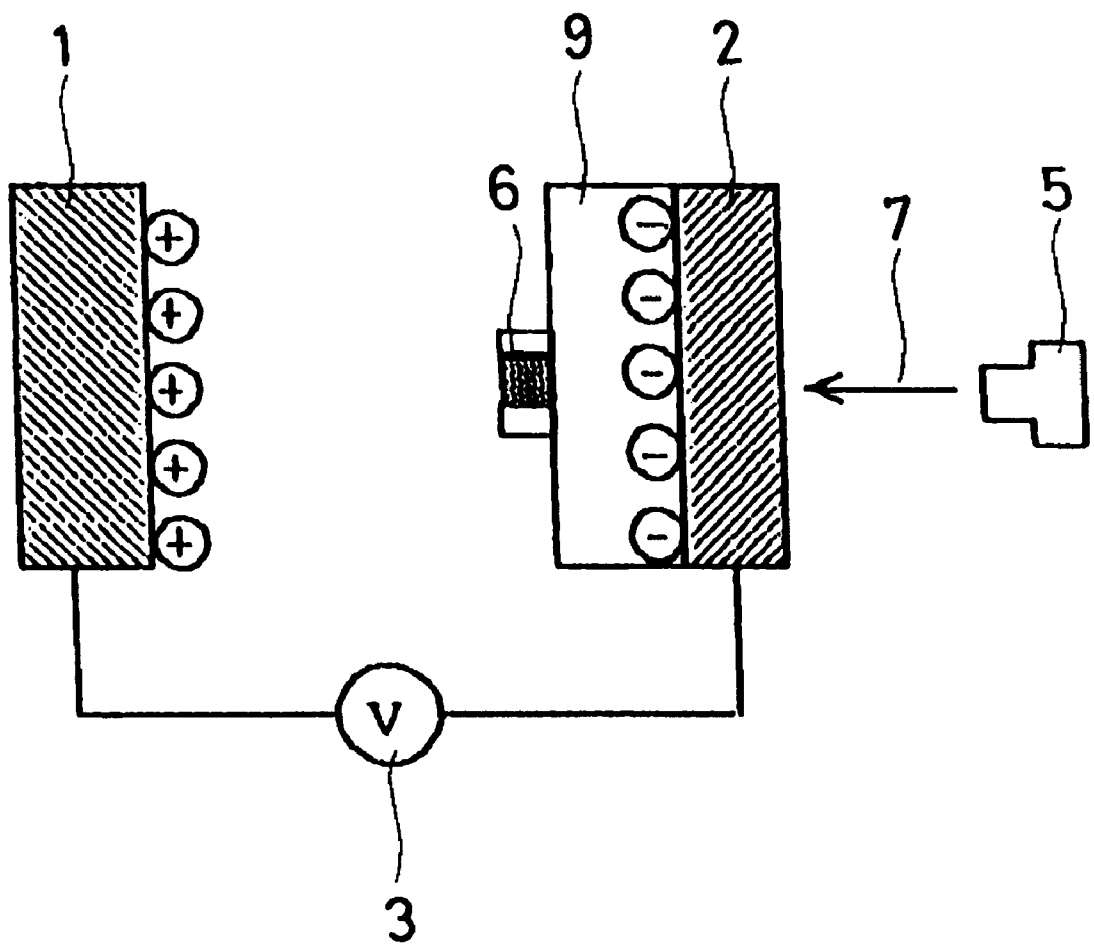
FIG. 3 is a diagram showing one embodiment of a third construction of a text/graphics printing unit used in a recording unit of the invention.
Figure 4:
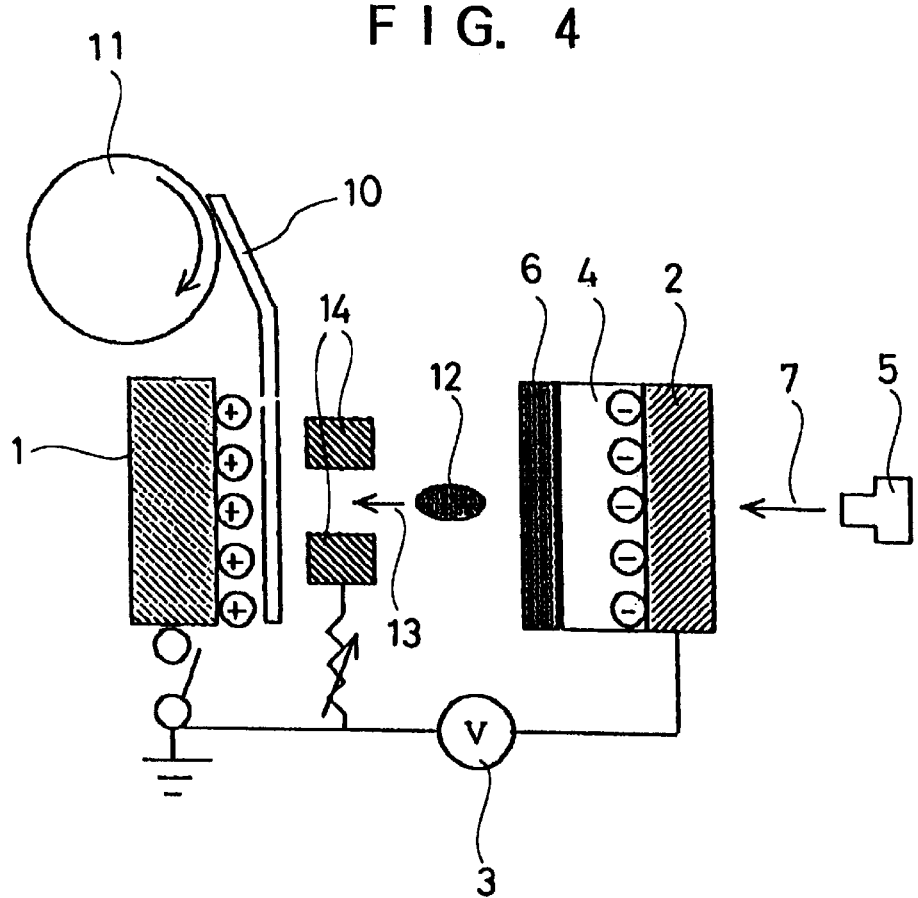
FIG. 4 is a diagram showing one embodiment of a fourth construction of a text/graphics printing unit used in a recording unit of the invention.
Figure 5:
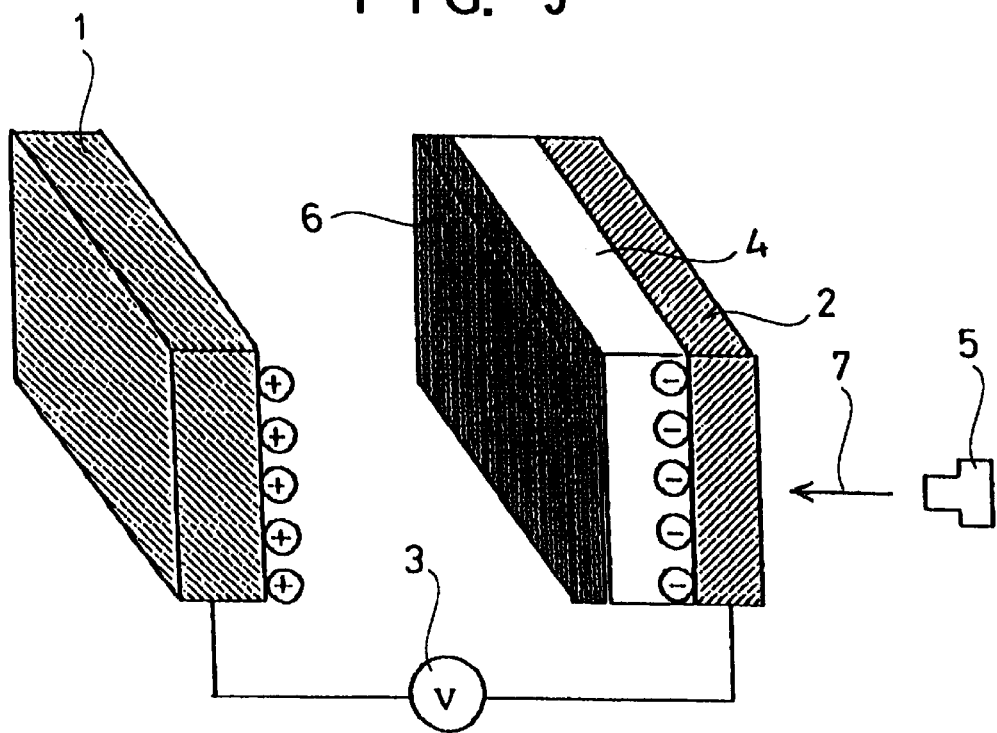
FIG. 5 is a diagram showing one embodiment of a fifth construction of a text/graphics printing unit used in a recording unit of the invention.
Figure 7:
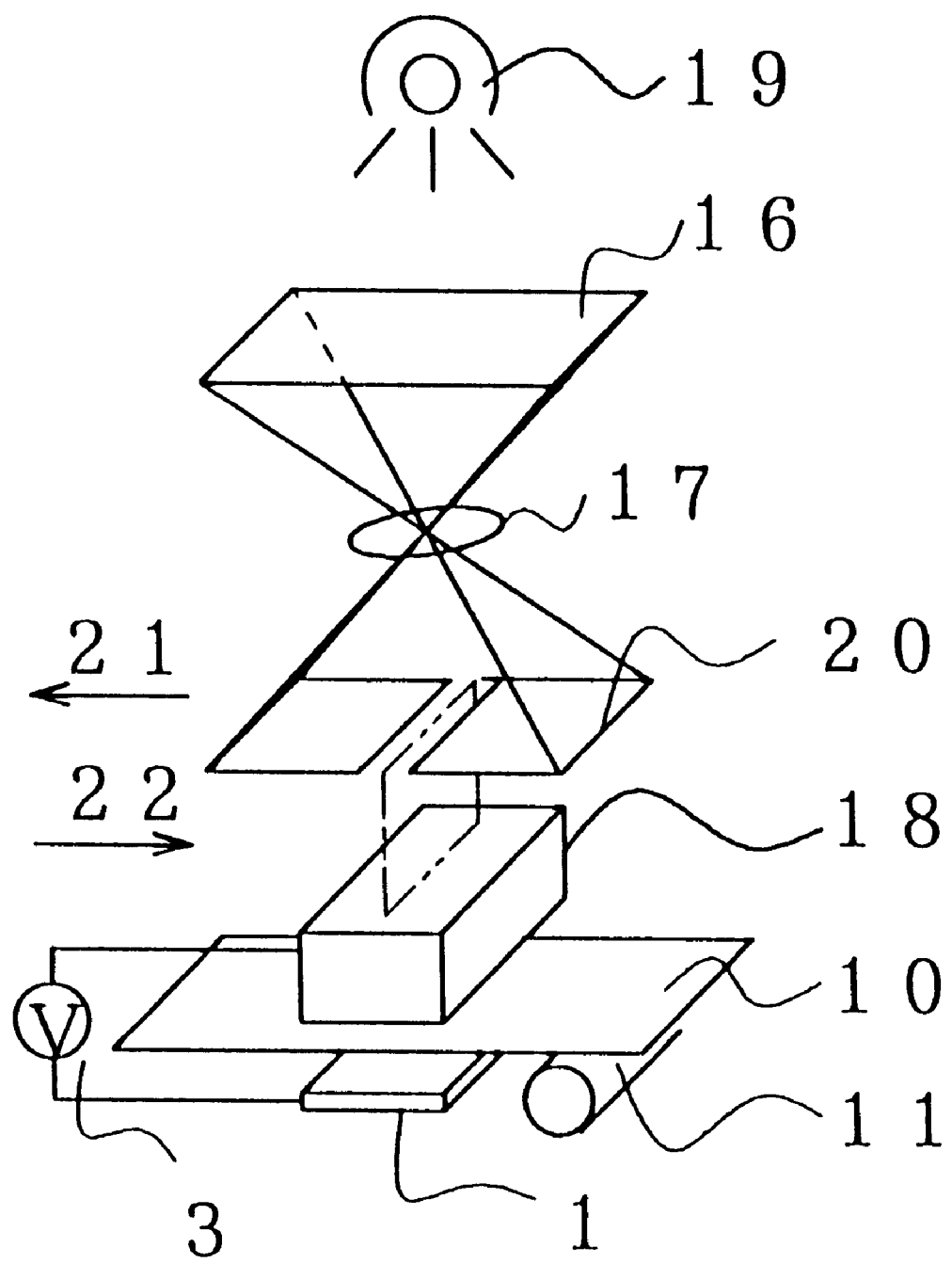
FIG. 7 is a diagram showing one embodiment of a first construction of a recording unit of the invention.

FIG. 7 is a diagram showing one embodiment of the first construction of the recording unit of the invention.

Referring to FIG. 7, a whole original image is illuminated as the entire original image illuminating means 19 projects light on the original 16. The whole original image illuminated by the entire original image illuminating means 19 is focused by the optical means 17 and entirely projected on the light control plate 20. The original image projected on the light control plate 20 is further projected on the print head 18, wherein the light transmitting area is determined by the slit width of the light control plate 20. A power source 3 applies a voltage set to a proper level between the print head 18 and a facing electrode 1, and projected light intensity is set to an appropriate level. The print head 18 causes only such portion of ink that exists in its illuminated area, which corresponds to the original image, to be ejected by the aforementioned print head ink squirting process. Part of the original image is reproduced as recording paper 10 is advanced by paper feeding means 11 to the underside of the print head 18 and the ink is absorbed by and fixes to one line segment on the recording paper 10, wherein the width of the line segment corresponds to the slit width of the light control plate 20. At this point, the voltage which has been applied between the print head 18 and the facing electrode 1 is eliminated, and the light control plate 20 and the print head 18 are moved in the direction of an arrow 21 as much as the width of each successive line segment without moving the recording paper 10. The moving speed of the print head 18 is determined so that the period of time required for absorption and fixation of the ink on the recording paper 10 matches the timing of projecting the light on the print head 18. Subsequently, the power source 3 reapplies the voltage between the print head 18 and the facing electrode 1 and the above-described process is repeated until the entire image of the original is reproduced on the recording paper 10. Finally, the voltage which has been applied to the print head 18 is eliminated, and the light control plate 20 and the print head 18 are driven in the direction of an arrow 22 to bring them back to their home positions.

Needless to say, the embodiment may be so modified that the light projected on the print head 18 is controlled by means of a mechanical shutter, an electronic shutter or a liquid crystal display (LCD) shutter while the power source 3 applies the voltage between the print head 18 and the facing electrode 1.

In this embodiment, the size of dots reproduced on the recording paper 10 is determined by the distance between the recording paper 10 and the print head 18, the voltage applied between the print head 18 and the facing electrode 1, and the amount of ink held in the print head 18.

If the distance between the recording paper 10 and the ink held by the print head 18 is too short in this embodiment, it may be difficult to smoothly insert the recording paper 10, or wrinkles of the recording paper 10 may come in contact with the ink. If this distance is too long, squirted ink may fall due to gravitational forces, making it difficult to reproduce a desired image. In view of the foregoing, the distance between the recording paper 10 and the ink held by the print head 18 should preferably be 0.2 to 1 mm, most preferably about 0.5 mm.

A detailed description of a light source used in the entire original image illuminating means 19 is omitted since the entire original image illuminating means 19 of this invention is essentially same as the aforementioned original image illuminating means 15. The light control plate 20 of this invention may be constructed with an opaque plastic film formed of polyethylene, nylon or polyimide, for instance, or a metal plate. The light transmitting area which allows a portion of the original image to pass through is determined by forming a slit in the plastic film or the metal plate. Needless to say, the light control plate 20 may be integrally attached to a light receiving surface of the print head 18. The width of this slit is determined by ink squirting conditions of the print head 18.

<Embodiment 2>

A second construction of a recording unit of the invention comprises slitlike original image illuminating means for projecting light on a slitlike portion of an original to obtain its optical image, optical means for focusing the optical image of the original obtained by the slitlike original image illuminating means, and a print head which ejects a burst of ink when exposed to light.

Figure 8:
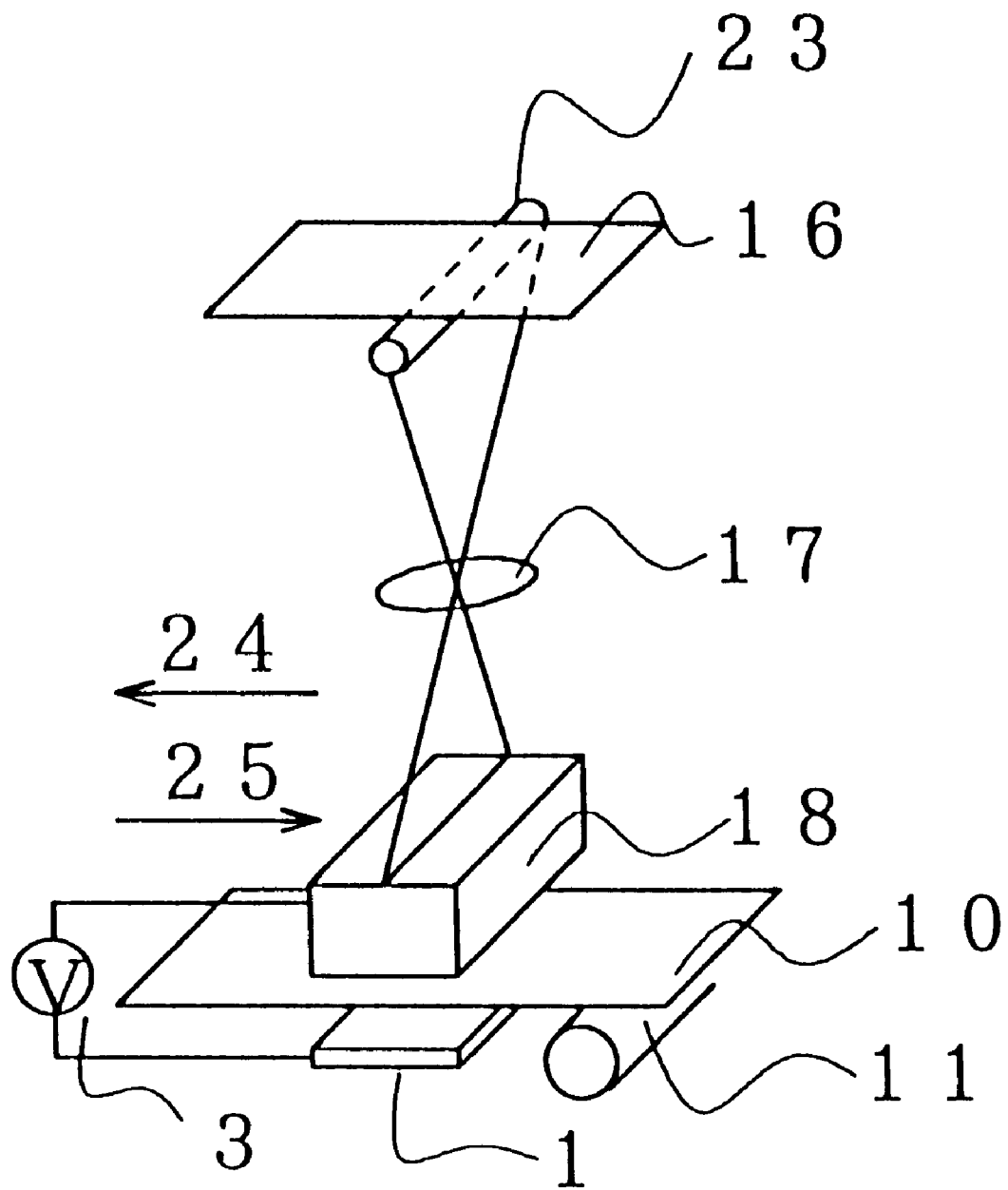
FIG. 8 is a diagram showing one embodiment of a second construction of a recording unit of the invention.

FIG. 8 is a diagram showing one embodiment of the second construction of the recording unit of the invention.

Referring to FIG. 8, a slitlike portion of an original image is illuminated as the slitlike original image illuminating means 23 project s light on the original 16. The slitlike portion of the original image illuminated by the slitlike original image illuminating means 23 is focused by the optical means 17 and projected on the print head 18. A power source 3 applies a voltage set to a proper level between the print head 18 and a facing electrode 1, and projected light intensity is set to an appropriate level. The print head 18 causes only such portion of ink that exists in its illuminated area, which corresponds to the original image, to be ejected by the aforementioned print head ink squirting process. Part of the original image is reproduced as recording paper 10 is advanced by paper feeding means 11 to the underside of the print head 18 and the ink is absorbed by and fixes to one line segment on the recording paper 10, wherein the width of the line segment corresponds to the slit width of a light source of the slitlike original image illuminating means 23. At this point, the voltage which has been applied between the print head 18 and the facing electrode 1 is eliminated, and the paper feeding means 11 advances the recording paper 10 in the direction of an arrow 24 as much as the width of each successive line segment. Also, the original 16 is moved in the direction of the arrow 24 as much as the width of each line segment.

Since this embodiment is configured to project the light on each slitlike portion of the original 16, it is required to relatively move the original 16 and the slitlike original image illuminating means 23. It is also required to relatively move the print head 18 and the recording paper 10. Accordingly, the invention is not limited to the above-described transport mechanism or movement mechanism, but any other configuration can be used as long as it is capable of guiding the optical image of the original 16 to the print head 18.

In a configuration in which the print head 18 is moved relative to the recording paper 10, the relative moving speed is so determined that the period of time required for absorption and fixation of the ink on the recording paper 10 matches the timing of projecting the light on the print head 18. Subsequently, the power source 3 reapplies the voltage between the print head 18 and the facing electrode 1 and the above-described process is repeated until the entire image of the original is reproduced on the recording paper 10. Finally, the voltage which has been applied to the print head 18 is eliminated, and the print head 18 is driven in the direction of an arrow 25 to bring it back to its home position.

A fluorescent lamp, a light-emitting diode (LED) and other light sources having a linear shape, as well as a line-shaped mirror for projecting light emitted by such light source in a linear pattern can be used to configure the slitlike original image illuminating means 23 of this invention. The slit width of the light source used in the slitlike original image illuminating means 23 is determined by ink squirting conditions of the print head 18.

In this embodiment, the size of dots reproduced on the recording paper 10 is determined by the distance between the recording paper 10 and the print head 18, the voltage applied between the print head 18 and the facing electrode 1, and the amount of ink held in the print head 18.

The distance between the recording paper 10 and the print head 18 in this embodiment should preferably comply with the conditions already stated with reference to Embodiment 1 above.

<Embodiment 3>

A third construction of a recording unit of the invention comprises original image illuminating means for projecting light on an original to obtain its optical image, optical means for focusing the optical image of the original obtained by the original image illuminating means, optical sensing means for detecting the optical image of the original focused by the optical means and performing photoelectric conversion, light projecting means for projecting light based on an output signal of the optical sensing means, and a print head which ejects a burst of ink in accordance with the light projected by the light projecting means.

In this construction, elements of any constructions described with reference to Embodiment 1 and Embodiment 2 can be used as the original image illuminating means and associated constituent elements.

This is explained in specific details in the following discussion.

<Embodiment 3-1>

A first embodiment of the third construction of the recording unit of the invention comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, optical sensing means for detecting incident light from the light control plate and performing photoelectric conversion, light projecting means for projecting light based on an output signal of the optical sensing means, and a print head which ejects a burst of ink in accordance with the light projected by the light projecting means.

Figure 9:
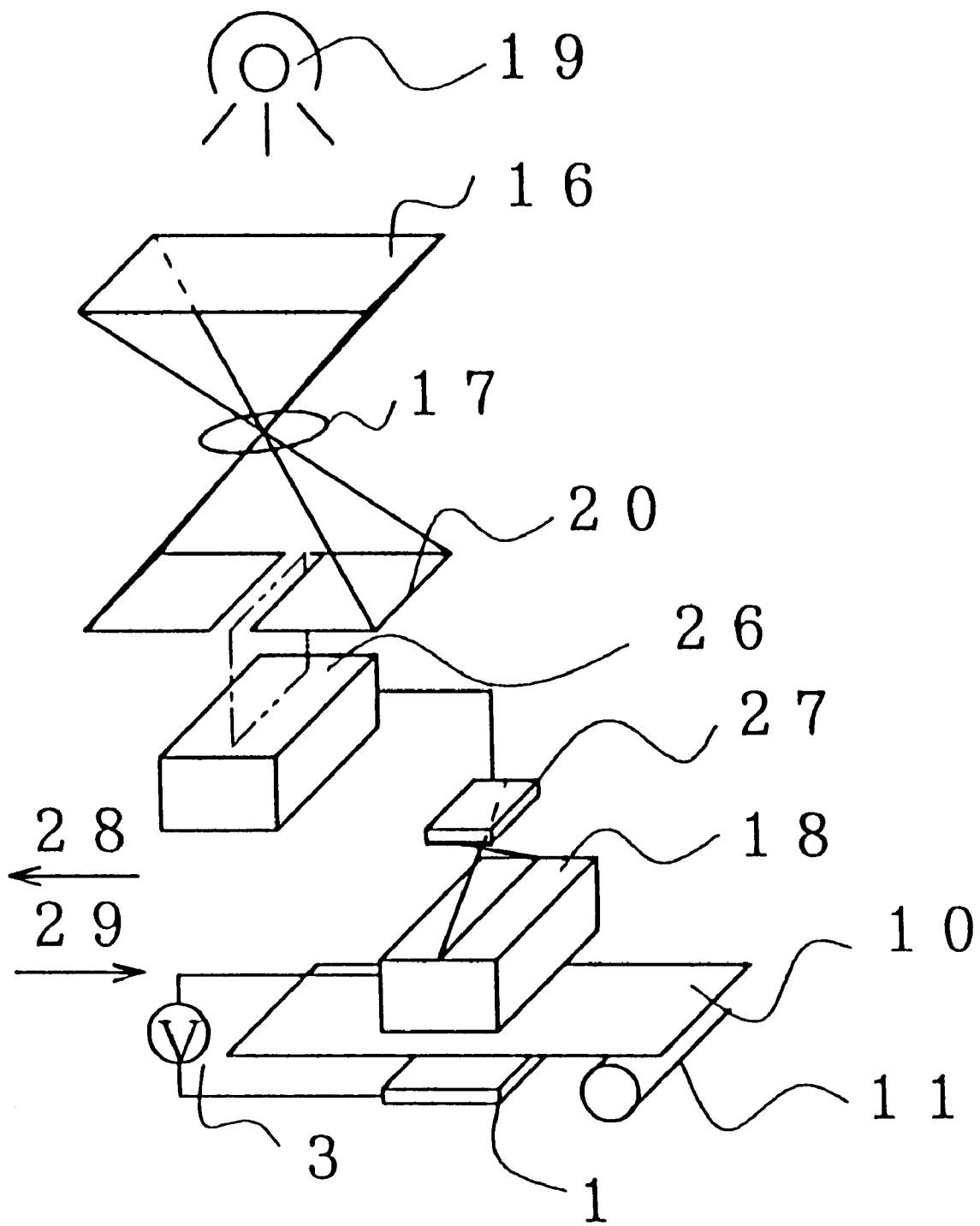
FIG. 9 is a diagram showing a first embodiment of a third construction of a recording unit of the invention.

FIG. 9 is a diagram showing the first embodiment of the third construction.

Referring to FIG. 9, a whole original image is illuminated as the entire original image illuminating means 19 projects light on the original 16. The whole original image illuminated by the entire original image illuminating means 19 is focused by the optical means 17 and entirely projected on the light control plate 20. The original image projected on the light control plate 20 is further projected on the optical sensing means 26, wherein the light transmitting area is determined by the slit width of the light control plate 20. The optical sensing means 26 converts the original image into an electric signal through a photoelectric conversion process, and this electric signal is sent to the light projecting means 27. The light projecting means 27 projects light corresponding to the original image onto the print head 18. A power source 3 applies a voltage set to a proper level between the print head 18 and a facing electrode 1, and projected light intensity is set to an appropriate level. The print head 18 causes only such portion of ink that exists in its illuminated area, which corresponds to the original image, to be ejected by the aforementioned print head ink squirting process. Part of the original image is reproduced as recording paper 10 is advanced by paper feeding means 11 to the underside of the print head 18 and the ink is absorbed by and fixes to one line segment on the recording paper 10, wherein the width of the line segment corresponds to the slit width of the light control plate 20.

At this point, the voltage which has been applied between the print head 18 and the facing electrode 1 is eliminated, and the paper feeding means 11 advances the recording paper 10 in the direction of an arrow 28 as much as the width of each successive line segment. Also, the light control plate 20 is moved in the direction of the arrow 28 as much as the width of each line segment without moving the optical sensing means 26.

Since the image can be recorded if there is made provision for relatively moving the print head 18 and the recording paper 10, the invention is not limited to the above-described transport mechanism or movement mechanism.

The relative speed between the print head 18 and the recording paper 10 is so determined that the period of time required for absorption and fixation of the ink squirted from the print head 18 onto the recording paper 10 matches the timing of projecting the light on the print head 18.

Subsequently, the power source 3 reapplies the voltage between the print head 18 and the facing electrode 1 and the above-described process is repeated until the entire image of the original is reproduced on the recording paper 10. Finally, the voltage which has been applied to the print head 18 is eliminated.

In a case where a mechanism for moving the print head 18 is employed, the print head 18 is driven in the direction of an arrow 29 to bring it back to its home position.

A semiconductor laser can be used to configure the light projecting means 27 of this invention, whereby light corresponding to the original image is projected on the print head 18. Laser light emitted from a laser oscillating device like a semiconductor laser may be pass through an optical lens of the light projecting means 27, for instance, to optimize projected light intensity, focused light beam pattern, and so on. Further, a laser light scanning system can be constructed by use of a polygon mirror, for instance. Although the semiconductor laser is used as a light source of the light projecting means 27 in this embodiment, the light source is not limited thereto. A helium-neon laser, a semiconductor laser array, an LED array and a halogen lamp, for example, are also well suited for use as the light source. It is needless to say that an optical shutter array or an LCD television may be used instead of the aforementioned laser scanning optical system.

An image sensor, such as a charge-coupled device (CCD) or a photodiode array (PDA), is usable as the optical sensing means 26 of this invention. Featuring both scanning and optical sensing functions, the image sensor performs a photoelectric conversion process. Since the optical sensing means 26 performs analog-to-digital conversion of an original image signal, it is possible to add a circuit which compensates for uneven illuminance due to a shading effect of the optical means 17 and for uneven sensitivity of the image sensor. Furthermore, the optical system can be made compact and lightweight as its construction is simplified.

<Embodiment 3-2>

A second embodiment of the third construction of the recording unit of the invention comprises slitlike original image illuminating means for projecting light on a slitlike portion of an original to obtain its optical image, optical means for focusing the optical image of the original obtained by the slitlike original image illuminating means, optical sensing means for detecting the optical image of the original focused by the optical means and performing photoelectric conversion, light projecting means for projecting light based on an output signal of the optical sensing means, and a print head which ejects a burst of ink in accordance with the light projected by the light projecting means.

Figure 10:
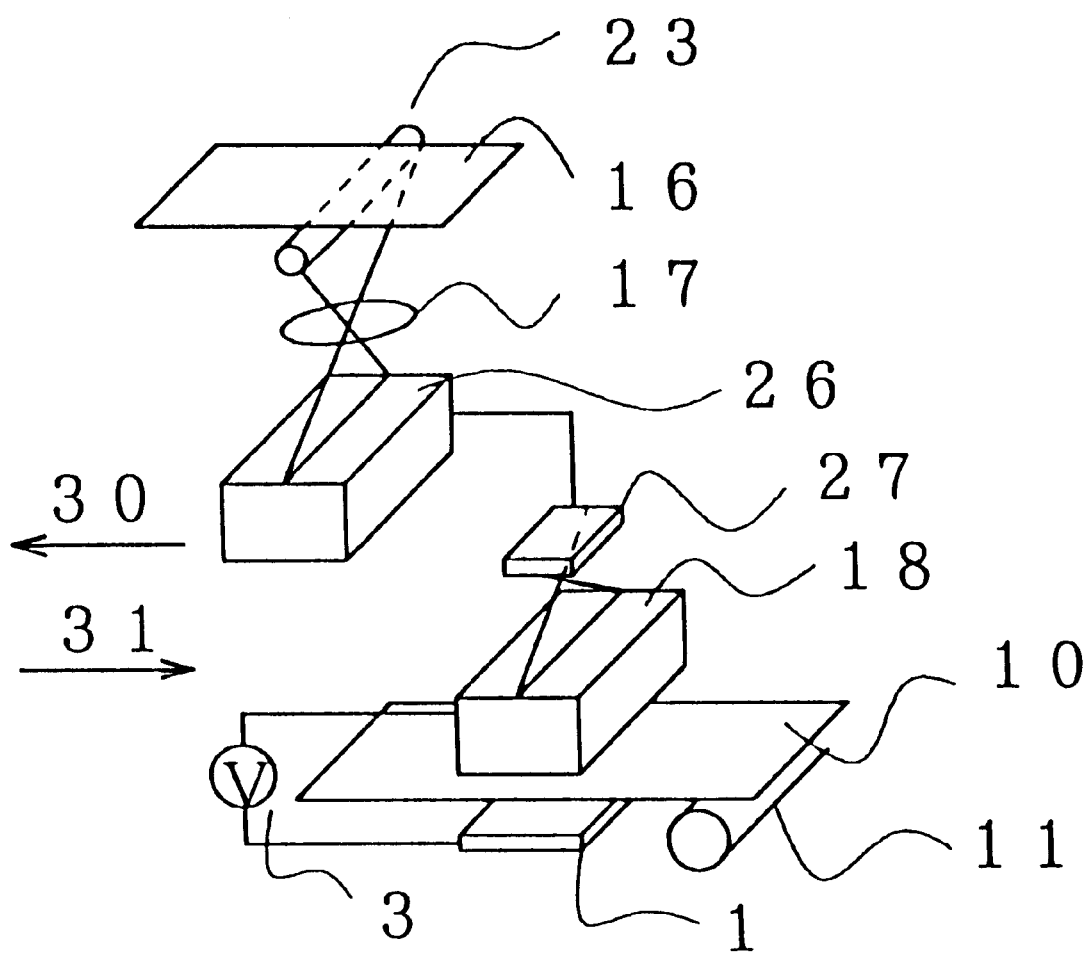
FIG. 10 is a diagram showing a second embodiment of a third construction of a recording unit of the invention.

FIG. 10 is a diagram showing the second embodiment of the third construction of the recording unit of the invention.

Referring to FIG. 10, a slitlike portion of an original image is illuminated as the slitlike original image illuminating means 23 projects light on the original 16. The slitlike portion of the original image illuminated by the slitlike original image illuminating means 23 is focused by the optical means 17 and projected on the optical sensing means 26. The optical sensing means 26 converts pixels of the original image into an electric signal through a photoelectric conversion process, and this electric signal is sent to the light projecting means 27. The light projecting means 27 projects light corresponding to the original image onto the print head 18. A power source 3 applies a voltage set to a proper level between the print head 18 and a facing electrode 1, and projected light intensity is set to an appropriate level. The print head 18 causes only such portion of ink that exists in its illuminated area, which corresponds to the original image, to be ejected by the aforementioned print head ink squirting process. Part of the original image is reproduced as recording paper 10 is advanced by paper feeding means 11 to the underside of the print head 18 and the ink is absorbed by and fixes to one line segment on the recording paper 10, wherein the width of the line segment corresponds to the slit width of a light source of the slitlike original image illuminating means 23. At this point, the voltage which has been applied between the print head 18 and the facing electrode 1 is eliminated, and the paper feeding means 11 advances the recording paper 10 in the direction of an arrow 30 as much as the width of each successive line segment. Also, the original 16 is moved in the direction of the arrow 30 as much as the width of each line segment.

Since this embodiment is configured to project the light on each slitlike portion of the original 16, it is required to relatively move the original 16 and the slitlike original image illuminating means 23. It is also required to relatively move the print head 18 and the recording paper 10. Accordingly, the invention is not limited to the above-described transport mechanism or movement mechanism, but any other configuration can be used as long as it is capable of guiding the optical image of the original 16 to the print head 18 via the optical sensing means.

The relative moving speed between the print head 18 and the recording paper 10 is so determined that the period of time required for absorption and fixation of the ink squirted from the print head 18 onto the recording paper 10 matches the timing of projecting the light on the print head 18.

Subsequently, the power source 3 reapplies the voltage between the print head 18 and the facing electrode 1 and the above-described process is repeated until the entire image of the original is reproduced on the recording paper 10. Finally, the voltage which has been applied to the print head 18 is eliminated.

In a case where a mechanism for moving the print head 18 is employed, the print head 18 is driven in the direction of an arrow 31 to bring it back to its home position.

<Embodiment 4>

Described below is how the recording units of the present invention are implemented in color recording units.

A color recording unit of the invention comprises original image illuminating means for projecting light on an original to obtain its optical image, optical means for focusing the optical image of the original obtained by the original image illuminating means, a color filter which serves as color separation means suitable for colors of the original image, and print heads which eject bursts of inks when exposed to light, the print heads being provided with means for feeding colored inks compatible with colors of the color filter.

In the color recording units of the invention, it is also possible to employ appropriate combinations of the original image illuminating means and their associated constituent elements, the print heads or the text/graphics printing units, and other constituent elements described in sections titled "Modes of Carrying Out the Invention," Embodiment 1, Embodiment 2, Embodiment 3-1 and Embodiment 3-2.

It goes without saying that the color recording units of the invention are not simply defined by whether the print heads are constructed as separate elements for different colors or combined into a one-piece element. In addition, they are not simply defined by the construction, configuration or mounting position of the color filter. Needless to say, they are not simply defined by transport mechanisms or movement mechanisms used in the color recording units.

Accordingly, the color recording units of the invention are not limited to specific embodiments which are described below.

<Embodiment 4-1>

A first construction of a color recording unit of the invention comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, a color filter which serves as color separation means suitable for colors of the original image, and print heads which eject bursts of inks when exposed to light, the print heads being provided with means for feeding colored inks compatible with colors of the color filter.

FIG. 11 is a diagram showing one embodiment of the first construction of the color recording unit of the invention.

As shown in FIG. 11, this embodiment is constructed in such a way that three linear print heads 18 having widths corresponding to the printing width of recording paper 10 are horizontally arranged side by side, wherein yellow (Y), magenta (M) and cyan (C) inks are supplied to the individual print heads 18.

A recording sequence begins with activation of a yellow print head 18-1 (i.e., the print head 18 to which yellow ink is supplied), in which a whole original image is illuminated as the entire original image illuminating means 19 projects light on the original 16 at first. The whole original image illuminated by the entire original image illuminating means 19 is focused by the optical means 17 and entirely projected on the light control plate 20 through a yellow portion of the color filter 32. The original image projected on the light control plate 20 is further projected on the yellow print head 18-1, wherein the light transmitting area is determined by the slit width of the light control plate 20. A power source 3 applies a voltage set to a proper level between the yellow print head 18-1 and a facing electrode 1, and projected light intensity is set to an appropriate level. The yellow print head 18-1 causes only such portion of yellow ink that exists in its illuminated area, which corresponds to the original image, to be ejected by the aforementioned print head ink squirting process. Part of the original image is reproduced as the recording paper 10 is advanced by paper feeding means 11 to the underside of the print head 18 and the yellow ink is absorbed by and fixes to one line segment on the recording paper 10, wherein the width of the line segment corresponds to the slit width of the light control plate 20. At this point, the voltage which has been applied between the yellow print head 18-1 and the facing electrode 1 is eliminated.

Next, the yellow print head 18-1 is moved in the direction of an arrow 33, and a magenta print head 18-2 (i.e., the print head 18 to which magenta ink is supplied) is moved up to the location of the light control plate 20 without moving the recording paper 10. The color filter 32 is then rotated in the direction of an arrow 35 so that its magenta portion matches the location of the magenta print head 18-2. The power source 3 applies a voltage between the magenta print head 18-2 and the facing electrode 1. This causes only such portion of magenta ink that exists in an illuminated area, which corresponds to the original image, to be ejected according to the aforementioned recording sequence. Part of the original image is reproduced as the magenta ink is absorbed by and fixes to the one line segment on the recording paper 10, wherein the width of the line segment corresponds to the slit width of the light control plate 20. At this point, the voltage which has been applied between the magenta print head 18-2 and the facing electrode 1 is eliminated.

Next, the magenta print head 18-2 is moved in the direction of the arrow 33, and a cyan print head 18-3 (i.e., the print head 18 to which cyan ink is supplied) is moved up to the location of the light control plate 20 without moving the recording paper 10. The color filter 32 is then rotated in the direction of the arrow 35 so that its cyan portion matches the location of the cyan print head 18-3. The power source 3 applies a voltage between the cyan print head 18-3 and the facing electrode 1. This causes only such portion of cyan ink that exists in an illuminated area, which corresponds to the original image, to be ejected according to the aforementioned recording sequence. Part of the original image is reproduced as the cyan ink is absorbed by and fixes to the one line segment on the recording paper 10, wherein the width of the line segment corresponds to the slit width of the light control plate 20. At this point, the voltage which has been applied between the cyan print head 18-3 and the facing electrode 1 is eliminated.

Then, the paper feeding means 11 advances the recording paper 10 in the direction of the arrow 33 as much as the width of each successive line segment. Also, the print heads 18 are moved in the direction of an arrow 34 to bring the yellow print head 18-1 back to its home position, and the color filter 32 is rotated in the direction of the arrow 35 to return the yellow portion of the color filter 32 to its initial position. Subsequently, the power source 3 reapplies the voltage between the yellow print head 18-1 and the facing electrode 1 and the above-described process is repeated until the entire color image of the original 16 is reproduced on the recording paper 10. Finally, the voltage which has been applied to the print heads 18 is eliminated, and the print heads 18 are driven in the direction of the arrow 33 to bring them back to their home positions.

Although three kinds of inks are used in this embodiment, full-color, high-resolution text outputs and reproduction of graphics images with unlimited colors are obtainable by increasing the number of print heads 18 and feeding multiple colored inks to them, and increasing the number of color portions of the color filter 32 in accordance with the number of inks.

Furthermore, although the foregoing discussion of the embodiment has dealt with a recording method in which the print heads 18 are moved each time a yellow, magenta or cyan line segment is reproduced on the recording paper 10, the embodiment may of course be modified in such a way that complete images in yellow, magenta and cyan are reproduced in a successive order.

Moreover, the color filter 32 can perform its function no matter where it is located after an optical image of the original has been obtained until the color filter 32 is brought up to the location of each print head. Therefore, the color recording unit of the invention is not limited to specific locations of the color filter. The configuration and construction of the color filter are not limited to what has been described in this embodiment either.

These remarks apply to the following embodiments as well.

<Embodiment 4-2>

A second construction of a color recording unit of the invention comprises slitlike original image illuminating means for projecting light on a slitlike portion of an original to obtain its optical image, optical means for focusing the optical image of the original obtained by the slitlike original image illuminating means, a color filter which serves as color separation means suitable for colors of the original image, and print heads which eject bursts of inks when exposed to light, the print heads being provided with means for feeding colored inks compatible with colors of the color filter.

Figure 12:
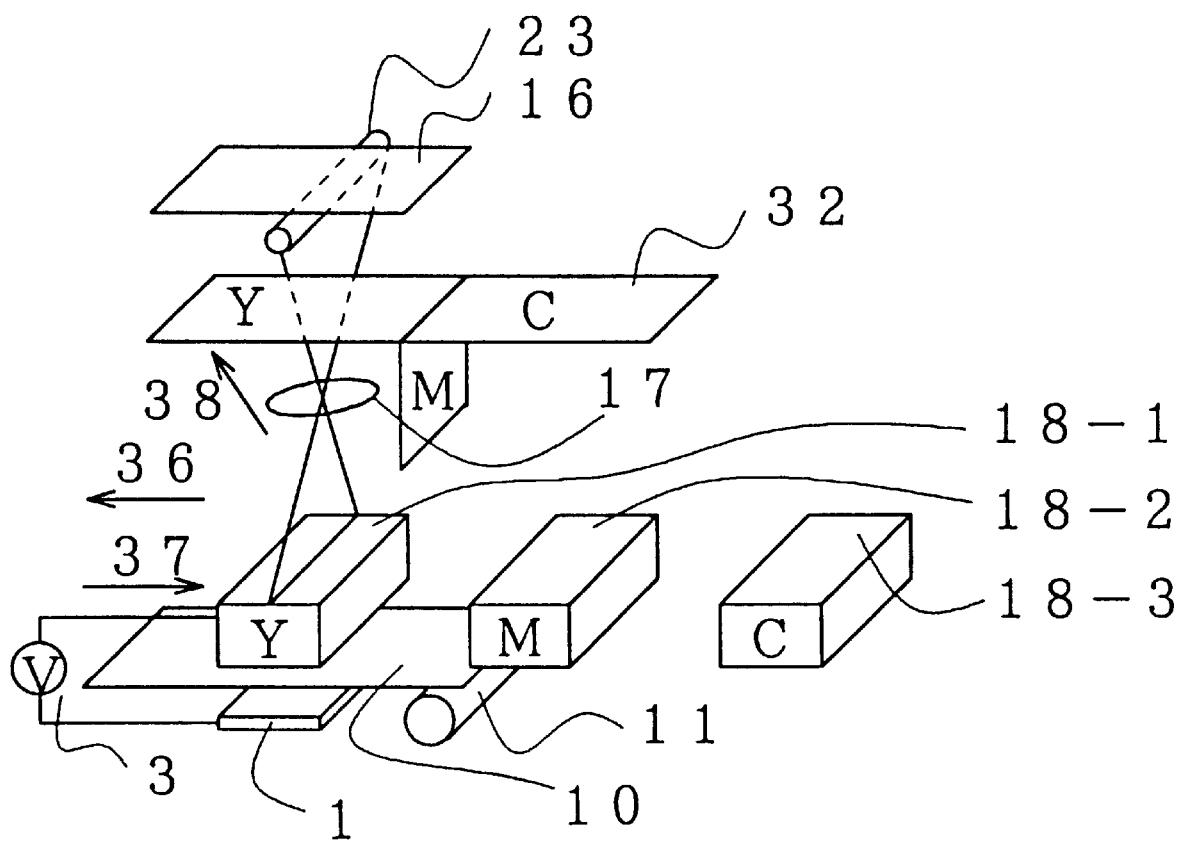
FIG. 12 is a diagram showing one embodiment of a second construction of a color recording unit of the invention.

FIG. 12 is a diagram showing one embodiment of the second construction of the color recording unit of the invention.

As shown in FIG. 12, this embodiment is constructed in such a way that three linear print heads 18 having widths corresponding to the printing width of recording paper 10 are horizontally arranged side by side, wherein yellow (Y), magenta (M) and cyan (C) inks are supplied to the individual print heads 18.

A recording sequence begins with activation of a yellow print head 18-1, in which a slitlike portion of an original image is illuminated as the slitlike original image illuminating means 23 projects light on the original 16 at first. The slitlike portion of the original image illuminated by the slitlike original image illuminating means 23 passes through a yellow portion of the color filter 32 and is focused by the optical means 17 and projected on the yellow print head 18-1. A power source 3 applies a voltage set to a proper level between the yellow print head 18-1 and a facing electrode 1, and projected light intensity is set to an appropriate level. The yellow print head 18-1 causes only such portion of yellow ink that exists in its illuminated area, which corresponds to the original image, to be ejected by the aforementioned print head ink squirting process. Part of the original image is reproduced as the recording paper 10 is advanced by paper feeding means 11 to the underside of the print head 18 and the yellow ink is absorbed by and fixes to one line segment on the recording paper 10, wherein the width of the line segment corresponds to the slit width of a light source of the slitlike original image illuminating means 23. At this point, the voltage which has been applied between the yellow print head 18-1 and the facing electrode 1 is eliminated.

Next, the yellow print head 18-1 is moved in the direction of an arrow 36, and a magenta print head 18-2 is moved up to the location of the optical means 17 without moving the recording paper 10. The color filter 32 is then rotated in the direction of an arrow 38 so that its magenta portion matches the location of the magenta print head 18-2. The power source 3 applies a voltage between the magenta print head 18-2 and the facing electrode 1. This causes only such portion of magenta ink that exists in an illuminated area, which corresponds to the original image, to be ejected according to the aforementioned recording sequence. Part of the original image is reproduced as the magenta ink is absorbed by and fixes to the one line segment on the recording paper 10, wherein the width of the line segment corresponds to the slit width of the light source of the slitlike original image illuminating means 23. At this point, the voltage which has been applied between the magenta print head 18-2 and the facing electrode 1 is eliminated.

Next, the magenta print head 18-2 is moved in the direction of the arrow 36, and a cyan print head 18-3 is moved up to the location of the optical means 17 without moving the recording paper 10. The color filter 32 is then rotated in the direction of the arrow 38 so that its cyan portion matches the location of the cyan print head 18-3. The power source 3 applies a voltage between the cyan print head 18-3 and the facing electrode 1. This causes only such portion of cyan ink that exists in an illuminated area, which corresponds to the original image, to be ejected according to the aforementioned recording sequence. Part of the original image is reproduced as the cyan ink is absorbed by and fixes to the one line segment on the recording paper 10, wherein the width of the line segment corresponds to the slit width of the light source of the slitlike original image illuminating means 23. At this point, the voltage which has been applied between the magenta print head 18-2 and the facing electrode 1 is eliminated.

Then, the paper feeding means 11 advances the recording paper 10 in the direction of the arrow 36 as much as the width of each successive line segment. Also, the original 16 is moved in the direction of the arrow 36 as much as the width of each line segment. Further, the print heads 18 are moved in the direction of an arrow 37 to bring the yellow print head 181 back to its home position, and the color filter 32 is rotated in the direction of the arrow 38 to return the yellow portion of the color filter 32 to its initial position. Subsequently, the power source 3 reapplies the voltage between the yellow print head 18-1 and the facing electrode 1 and the above-described process is repeated until the entire color image of the original 16 is reproduced on the recording paper 10. Finally, the voltage which has been applied to the print heads 18 is eliminated, and the print heads 18 are driven in the direction of the arrow 36 to bring them back to their home positions.

Although three kinds of inks are used in this embodiment, full-color, high-resolution text outputs and reproduction of graphics images with unlimited colors are obtainable by increasing the number of print heads 18 and feeding multiple colored inks to them, and increasing the number of color portions of the color filter 32 in accordance with the number of inks.

Furthermore, although the foregoing discussion of the embodiment has dealt with a recording method in which the print heads 18 are moved each time a yellow, magenta or cyan line segment is reproduced on the recording paper 10, the embodiment may of course be modified in such a way that complete images in yellow, magenta and cyan are reproduced in a successive order.

<Embodiment 4-3>

A third construction of a color recording unit of the invention comprises entire original image illuminating means for projecting light on the whole of an original to obtain its optical image, optical means for focusing the optical image of the original obtained by the entire original image illuminating means, a color filter/light control plate having slits for controlling light transmitting areas which allow portions of the optical image of the original focused by the optical means to pass through as well as color filters formed in the slits to provide color separation means suitable for colors of the original image, and print heads which eject bursts of inks when exposed to light, the print heads being provided with means for feeding colored inks compatible with colors of the individual color filters.

Figure 13:
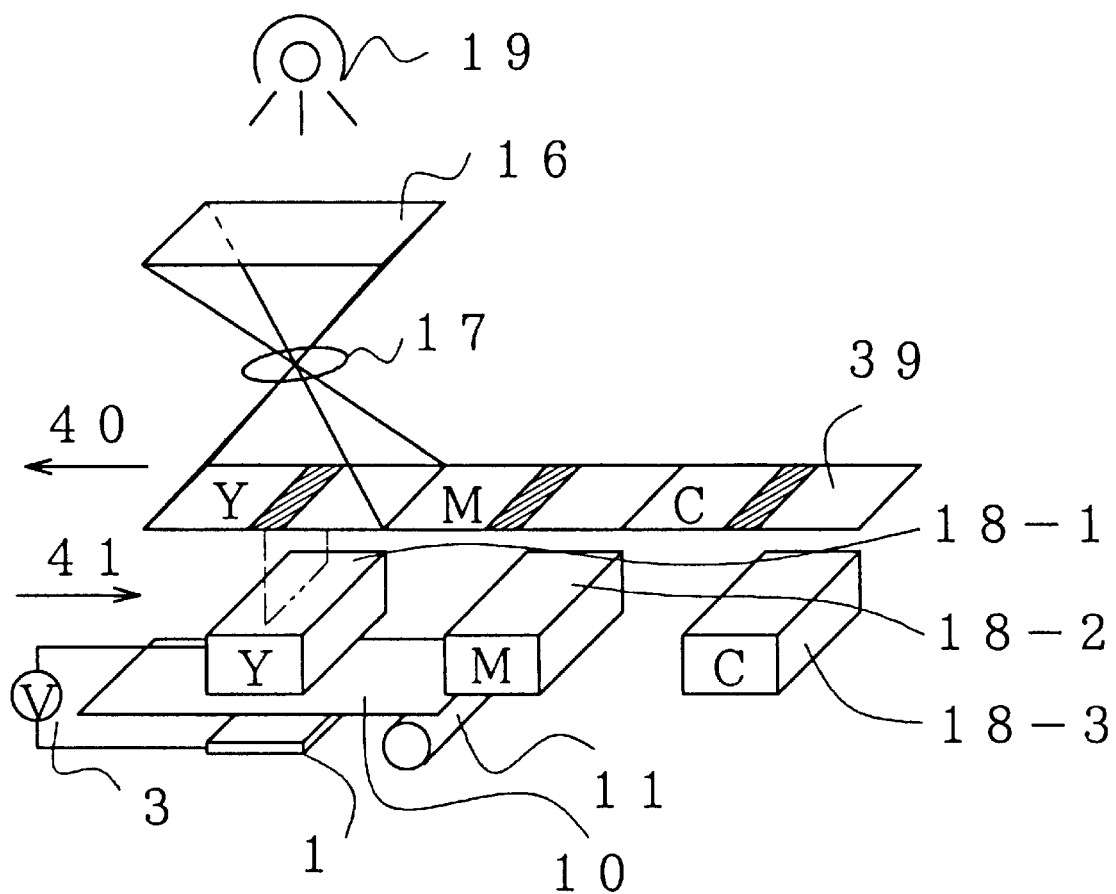
FIG. 13 is a diagram showing one embodiment of a third construction of a color recording unit of the invention.

FIG. 13 is a diagram showing one embodiment of the third construction of the color recording unit of the invention.

As shown in FIG. 13, this embodiment is constructed in such a way that three linear print heads 18 having widths corresponding to the printing width of recording paper 10 are horizontally arranged side by side, wherein yellow (Y), magenta (M) and cyan (C) inks are supplied to the individual print heads 18.

A recording sequence begins with activation of a yellow print head 18-1, in which a whole original image is illuminated as the entire original image illuminating means 19 projects light on the original 16 at first. The whole original image illuminated by the entire original image illuminating means 19 is focused by the optical means 17 and entirely projected on the color filter/light control plate 39. The original image projected on the color filter/light control plate 39 is further projected on the yellow print head 18-1 through a yellow color filter portion, wherein a light transmitting area is determined by the slit width of the color filter/light control plate 39. A power source 3 applies a voltage set to a proper level between the yellow print head 18-1 and a facing electrode 1, and projected light intensity is set to an appropriate level. The yellow print head 18-1 causes only such portion of yellow ink that exists in its illuminated area, which corresponds to the original image, to be ejected by the aforementioned print head ink squirting process. Part of the original image is reproduced as the recording paper 10 is advanced by paper feeding means 11 to the underside of the print head 18 and the yellow ink is absorbed by and fixes to one line segment on the recording paper 10, wherein the width of the line segment corresponds to the slit width of the color filter/light control plate 39. At this point, the voltage which has been applied between the yellow print head 18-1 and the facing electrode 1 is eliminated.

Next, the yellow print head 18-1 is moved in the direction of an arrow 40, and a magenta print head 18-2 and the color filter/light control plate 39 are moved in the direction of the arrow 40 without moving the recording paper 10. A magenta color filter portion of the color filter/light control plate 39 is then moved to a location just above the magenta print head 18-2. The power source 3 applies a voltage between the magenta print head 18-2 and the facing electrode 1. This causes only such portion of magenta ink that exists in an illuminated area, which corresponds to the original image, to be ejected according to the aforementioned recording sequence. Part of the original image is reproduced as the magenta ink is absorbed by and fixes to the one line segment on the recording paper 10, wherein the width of the line segment corresponds to the slit width of the color filter/light control plate 39. At this point, the voltage which has been applied between the magenta print head 18-2 and the facing electrode 1 is eliminated.

Next, the magenta print head 18-2 is moved in the direction of the arrow 40, and a cyan print head 18-3 and the color filter/light control plate 39 are moved in the direction of the arrow 40 without moving the recording paper 10. A cyan color filter portion of the color filter/light control plate 39 is then moved to a location just above the cyan print head 18-3. The power source 3 applies a voltage between the cyan print head 18-3 and the facing electrode 1. This causes only such portion of cyan ink that exists in an illuminated area, which corresponds to the original image, to be ejected according to the aforementioned recording sequence. Part of the original image is reproduced as the cyan ink is absorbed by and fixes to the one line segment on the recording paper 10, wherein the width of the line segment corresponds to the slit width of the color filter/light control plate 39. At this point, the voltage which has been applied between the cyan print head 18-3 and the facing electrode 1 is eliminated.

Then, the paper feeding means 11 advances the recording paper 10 in the direction of the arrow 40 as much as the width of each successive line segment. Also, the print heads 18 are moved in the direction of an arrow 41 to bring the yellow print head 18-1 back to its home position, and the color filter/light control plate 39 is moved in the direction of the arrow 41 to return the yellow color filter portion to its initial position. Subsequently, the power source 3 reapplies the voltage between the yellow print head 18-1 and the facing electrode 1 and the above-described process is repeated until the entire color image of the original 16 is reproduced on the recording paper 10. Finally, the voltage which has been applied to the print heads 18 is eliminated, and the print heads 18 are driven in the direction of the arrow 41 to bring them back to their home positions.

Although three kinds of inks are used in this embodiment, full-color, high-resolution text outputs and reproduction of graphics images with unlimited colors are obtainable by increasing the number of print heads 18 and feeding multiple colored inks to them, and increasing the number of color filters provided in the color filter/light control plate 39 in accordance with the number of inks.

Furthermore, although the foregoing discussion of the embodiment has dealt with a recording method in which the print heads 18 are moved each time a yellow, magenta or cyan line segment is reproduced on the recording paper 10, the embodiment may of course be modified in such a way that complete images in yellow, magenta and cyan are reproduced in a successive order.

Again, the construction, configuration and mounting position of the color filter/light control plate 39 are not limited to what has been described in this embodiment. For example, the construction employed in Embodiment 4-1 or Embodiment 4-2 maybe applied to the color filter/light control plate 39. Conversely, the construction of the color filter/light control plate of this embodiment may be applied to the color filter of Embodiment 4-1 or Embodiment 4-2.

<Embodiment 4-4>

A fourth construction of a color recording unit of the invention comprises entire original image illuminating means for projecting light on the whole of an original to obtain its optical image, optical means for focusing the optical image of the original obtained by the entire original image illuminating means, a color filter/light control plate having slits for controlling light transmitting areas which allow portions of the optical image of the original focused by the optical means to pass through as well as color filters formed in the slits to provide color separation means suitable for colors of the original image, and a print head which ejects bursts of inks when exposed to light, the print head being divided into a plurality of segments which are provided with means for feeding colored inks compatible with colors of the individual color filters.

Figure 14:
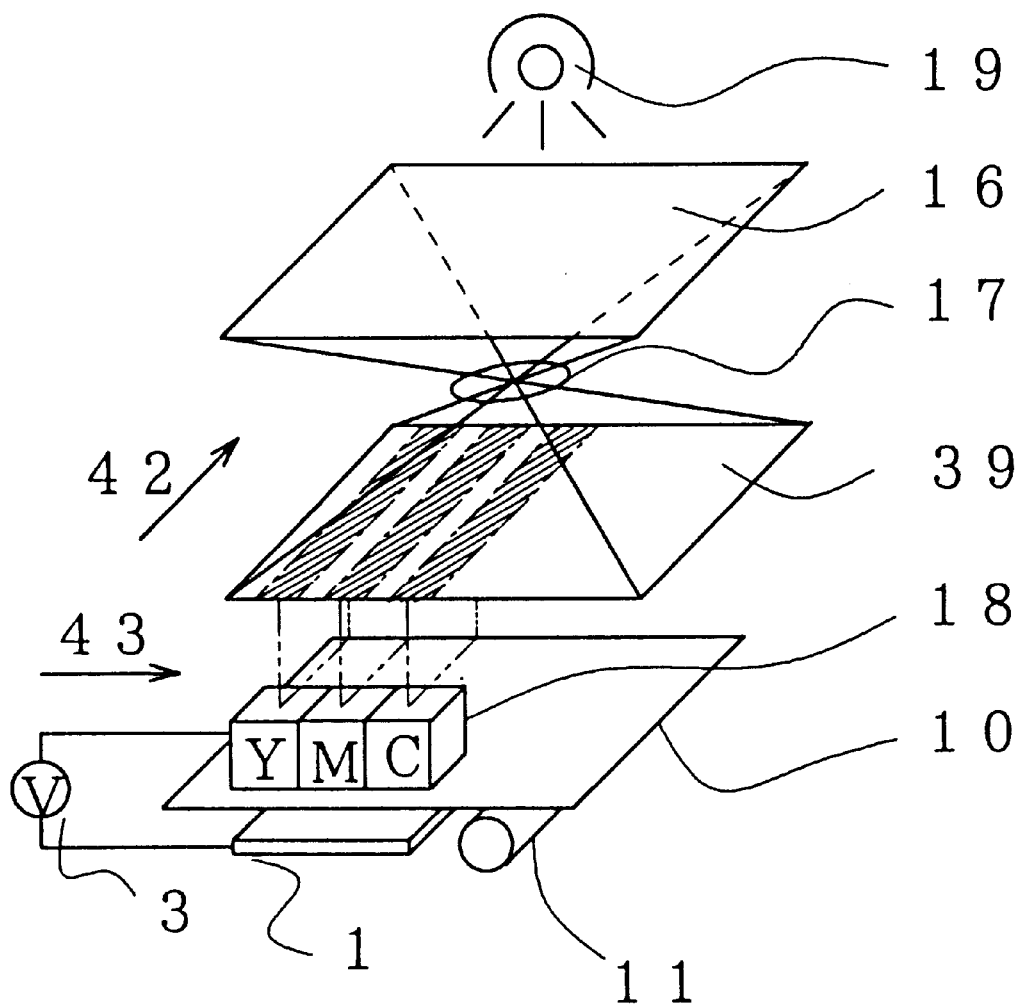
FIG. 14 is a diagram showing one embodiment of a fourth construction of a color recording unit of the invention.

FIG. 14 is a diagram showing one embodiment of the fourth construction of the color recording unit of the invention.

Referring to FIG. 14, the print head 18 is divided into a plurality of segments, wherein yellow (Y), magenta (M) and cyan (C) inks are supplied to the individual segments of the print head 18.

A recording sequence begins with activation of print head 18, in which a whole original image is illuminated as the entire original image illuminating means 19 projects light on the original 16 at first. The whole original image illuminated by the entire original image illuminating means 19 is focused by the optical means 17 and entirely projected on the color filter/light control plate 39. The original image projected on the color filter/light control plate 39 is further projected on the yellow print head 18-1 through a yellow color filter portion, wherein a light transmitting area is determined by the slit width of the color filter/light control plate 39. The original image projected on the color filter/light control plate 39 is further projected on a yellow segment of the print head 18 through a yellow color filter portion, wherein a light transmitting area is determined by the slit width of the color filter/light control plate 39. A power source 3 applies a voltage set to a proper level between the print head 18 and a facing electrode 1, and projected light intensity is set to an appropriate level. The yellow segment of the print head 18 causes only such portion of yellow ink that exists in its illuminated area, which corresponds to the original image, to be ejected by the aforementioned print head ink squirting process. Part of the original image is reproduced as recording paper 10 is advanced by paper feeding means 11 to the underside of the print head 18 and the yellow ink in a region corresponding to the slit width of the color filter/light control plate 39 is absorbed by and fixes to the recording paper 10.

On the other hand, a magenta segment of the print head 18 causes only such portion of magenta ink that exists in the illuminated area, which corresponds to the original image, to be ejected according to the above-described recording sequence with the same timing. Part of the original image is reproduced as the magenta ink in a region corresponding to the slit width of the color filter/light control plate 39 is absorbed by and fixes to the recording paper 10.

Also, a cyan segment of the print head 18 causes only such portion of cyan ink that exists in the illuminated area, which corresponds to the original image, to be ejected according to the above-described recording sequence with the same timing. Part of the original image is reproduced as the cyan ink in a region corresponding to the slit width of the color filter/light control plate 39 is absorbed by and fixes to the recording paper 10. At this point, the voltage which has been applied between the print head 18 and the facing electrode 1 is eliminated.

Subsequently, the print head 18 is moved in the direction of an arrow 42, and the power source 3 applies the voltage to the print head 18. Part of the original image is reproduced as the individual inks ejected from the yellow segment, the magenta segment and the cyan segment of the print head 18 are absorbed by and fix to individual line segments of which width corresponds to the slit width of the color filter/light control plate 39 according to the above-described recording sequence. At this point, the voltage which has been applied between the print head 18 and the facing electrode 1 is eliminated.

Then, the paper feeding means 11 moves the recording paper 10 in the direction of an arrow 43 as much as the width of each successive line segment which corresponds the slit width of the color filter/light control plate 39. Further, the print head 18 is returned to its home position. Subsequently, the power source 3 reapplies the voltage between the print head 18 and the facing electrode 1 and the above-described process is repeated until the entire color image of the original 16 is reproduced on the recording paper 10. Finally, the voltage which has been applied to the print head 18 is eliminated, and the print head 18 is returned to its home position.

Although three kinds of inks are used in this embodiment, full-color, high-resolution text outputs and reproduction of graphics images with unlimited colors are obtainable by increasing the number of segments of the print head 18 and feeding multiple colored inks to them, and increasing the number of color filter portions provided in the color filter/light control plate 39 in accordance with the number of inks.

Although the length of the print head is made shorter than the printable width in this embodiment, the length of the print head may of course be matched with the printable width. In this case, it becomes unnecessary to move the print head in a primary scanning direction (direction of the arrow 42).

<Embodiment 5>

Figure 15:
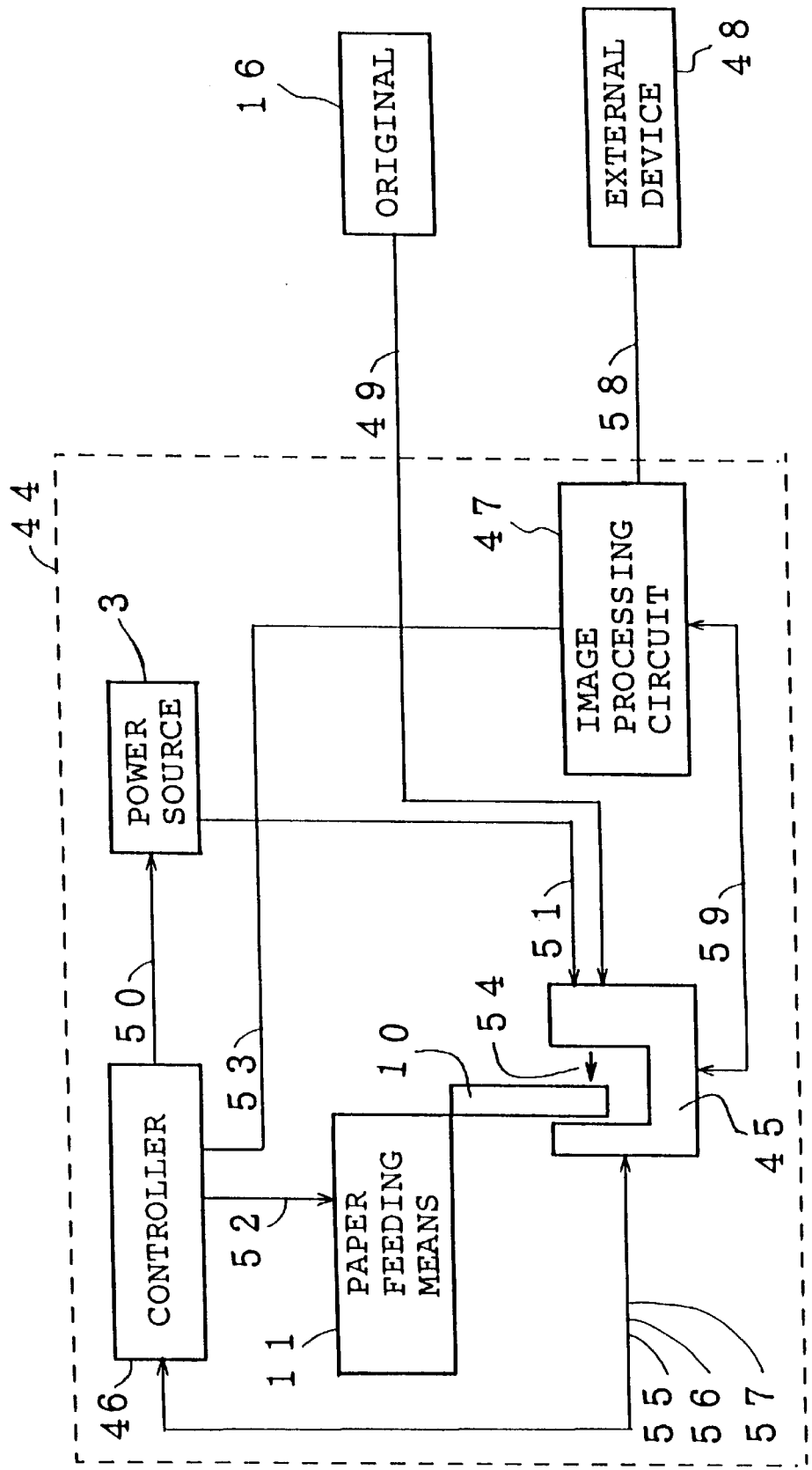
FIG. 15 is a diagram showing one embodiment of a recording system employing a recording unit or a color recording unit of the invention.
Figure 16:
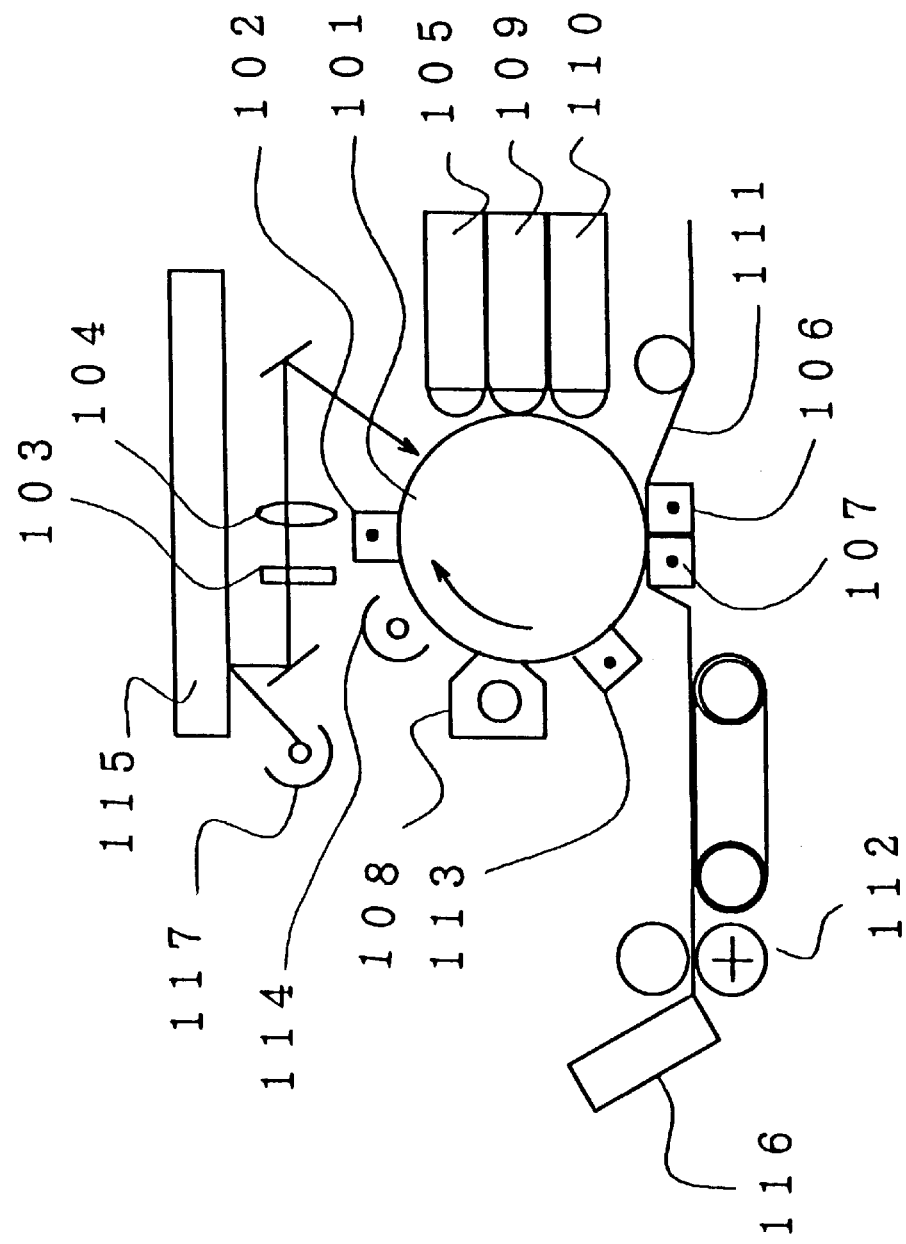
FIG. 16 is a diagram showing one example of a construction of a color copying machine utilizing a conventional electrophotographic process.

FIG. 15 is a diagram showing one embodiment of a construction of a recording system employing a recording unit of the invention described in the foregoing Embodiment 1 to Embodiment 4.

Referring to FIG. 15, the recording system 44 illuminates original image pixels 49 in a recording unit 45 when an original 16 is inserted. Then, ink 54 corresponding to the original image pixels 49 is squirted from the recording unit 45 in the direction of an arrow, and the original 16 is reproduced as the ink 54 attaches to and is absorbed by recording paper 10. The ink 54 is squirted in synchronism with the recording paper 10 by transmitting a recording paper control signal 52 from a controller 46 to paper feeding means 11. The controller 46 sets a voltage value 50 of a power source 3 and the power source 3 supplies a resultant voltage 51 to the recording unit 45.

Signals such as a drive signal 57 for driving a light control plate, optical means, color filters and so on which are not illustrated but contained in the recording unit 45, a light control signal 55 for controlling the intensity and pulse width of light projected by a light source which illuminates the original 16, and an optical sensing control signal 56 for controlling optical detection of the focused original image pixels 49 are output under the control of the controller 46, whereby a dot pattern formed by the ink 54 that is reproduced on the recording paper 10 is controlled.

This embodiment features, in addition to the construction of the recording system for reproducing the original 16, a function as a color printer, in which an external device 48 capable of transmitting image pixels enters image data 58 to the recording unit 45, and an image processing circuit 47 performs image corrections and pattern recognition, converts data on the individual pixels and outputs image pixel data 59. The image pixel data 59 is transmitted to the recording unit 45 in synchronism with a trigger signal 53 fed from the controller 46. As a result, the ink 54 is squirted from the recording unit 45 in accordance with the image pixel data 59, and an image is reproduced and transferred as the ink 54 attaches to and is absorbed by recording paper 10.

Although the function as the printer is included in the construction of this embodiment, it is needless to say that the printer function is not absolutely required.

By carrying out the aforementioned process, the recording system 44 of this invention can produce high-resolution, high-quality printouts at a high speed on recording media of arbitrary forms without mechanical contact.

As described above, a recording unit of the invention comprises original image illuminating means for projecting light on an original to obtain its optical image, optical means, and a print head which ejects a burst of ink when exposed to light. This construction produces the following effect.

(1) Since the light corresponding to the original image is projected on the print head by the original image illuminating means in this construction, the recording process is of a non-contact type and capable of high-speed processing.

A recording unit of another construction comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, and a print head which ejects a burst of ink when exposed to light. This construction produces the following effects.

(2) The slit formed in the light control plate permits control the amount of light projected on the print head, also enabling stabilized and high-speed squirting of the ink from the print head.

(3) Since the light can be projected on the whole of the original and the light control plate suitable for the area of the original image can be used in this construction, the original is not limited in its physical size.

A recording unit of another construction comprises slitlike original image illuminating means for projecting light on a slitlike portion of an original to obtain its optical image, optical means for focusing the optical image of the original obtained by the slitlike original image illuminating means, and a print head which ejects a burst of ink when exposed to light. This construction produces the following effect.

(4) The use of a slitted light source as the means for illuminating the original produces a high-resolution original image to be projected on the print head, making it possible to reproduce the original image on recording paper with high definition.

A recording unit of another construction comprises original image illuminating means for projecting light on an original to obtain its optical image, optical means for focusing the optical image of the original obtained by the original image illuminating means, optical sensing means for detecting the optical image of the original focused by the optical means and performing photoelectric conversion, light projecting means for projecting light based on an output signal of the optical sensing means, and a print head which ejects a burst of ink in accordance with the light projected by the light projecting means. This construction produces the following effects.

(5) Since the projection of light onto the print head is made based on an electric signal, high-speed and high resolution image reproduction can be achieved.

(6) The optical system can be made compact and lightweight as its construction is simplified.

A recording unit of another construction comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, optical sensing means for detecting incident light from the light control plate and performing photoelectric conversion, light projecting means for projecting light based on an output signal of the optical sensing means, and a print head which ejects a burst of ink in accordance with the light projected by the light projecting means. This construction produces the following effect.

(7) Since the light is projected on the whole of the original and original image data is converted into an electric signal by the optical sensing means, it is possible to reproduce the original on recording paper using image pixel data obtained through image processing of the original image data.

A recording unit of another construction comprises slitlike original image illuminating means for projecting light on a slitlike portion of an original to obtain its optical image, optical means for focusing the optical image of the original obtained by the slitlike original image illuminating means, optical sensing means for detecting the optical image of the original focused by the optical means and performing photoelectric conversion, light projecting means for projecting light based on an output signal of the optical sensing means, and a print head which ejects a burst of ink in accordance with the light projected by the light projecting means. This construction produces the following effect.

(8) Since the light is projected on the slitlike portion of the original and original image data is converted into an electric signal by the optical sensing means, it is possible to reproduce the original on recording paper with high resolution.

A recording unit of another construction comprises original image illuminating means for projecting light on an original to obtain its optical image, optical means for focusing the optical image of the original obtained by the original image illuminating means, a color filter suitable for colors of the original image, and print heads which eject bursts of inks when exposed to light, the print heads being provided with means for feeding colored inks compatible with colors of the color filter. This construction produces the following effect.

(9) This construction permits provision of a plurality of print heads, and inks suitable for the original may be supplied to the individual print heads. This removes limitations on the number of colors and enables full-color image reproduction with high definition.

A recording unit of another construction comprises entire original image illuminating means for projecting light on the whole of an original to obtain its optical image, optical means for focusing the optical image of the original obtained by the entire original image illuminating means, a light control plate having a slit for controlling a light transmitting area which allows a portion of the optical image of the original focused by the optical means to pass through, a color filter which serves as color separation means suitable for colors of the original image, and print heads which eject bursts of inks when exposed to light, the print heads being provided with means for feeding colored inks compatible with colors of the color filter. This construction produces the following effect.

(10) Since the light can be projected on the whole of the original and the light control plate suitable for the area of the original image can be used in this construction, full-color, high-definition image reproduction is possible with no limitations on the physical size of the original.

A recording unit of another construction comprises entire original image illuminating means for projecting light on the whole of an original to obtain its optical image, optical means for focusing the optical image of the original obtained by the entire original image illuminating means, a color filter/light control plate having slits for controlling light transmitting areas which allow portions of the optical image of the original focused by the optical means to pass through as well as color filters formed in the slits suitable for colors of the original image, and print heads which eject bursts of inks when exposed to light, the print heads being provided with means for feeding colored inks compatible with colors of the individual color filters. This construction produces the following effect.

(11) The use of the color filter/light control plate in which a light control plate and color filters are integrated makes it possible to achieve a compact system configuration at reduced costs.

A recording unit of another construction comprises slitlike original image illuminating means for projecting light on a slitlike portion of an original to obtain its optical image, optical means for focusing the optical image of the original obtained by the slitlike original image illuminating means, a color filter which serves as color separation means suitable for colors of the original image, and print heads which eject bursts of inks when exposed to light, the print heads being provided with means for feeding colored inks compatible with colors of the color filter. This construction produces the following effect.

(12) The light can be projected on the slitlike portion of the original so that an original image is projected onto the print heads with high resolution. It is therefore possible to produce full-color image reproduction on recording paper with high definition.

A recording unit of another construction comprises entire original image illuminating means for projecting light on the whole of an original to obtain its optical image, optical means for focusing the optical image of the original obtained by the entire original image illuminating means, a color filter/light control plate having slits for controlling light transmitting areas which allow portions of the optical image of the original focused by the optical means to pass through as well as color filters formed in the slits suitable for colors of the original image, and a print head which ejects bursts of inks when exposed to light, the print head being divided into a plurality of segments which are provided with means for feeding colored inks compatible with colors of the individual color filters. This construction produces the following effect.

(13) By dividing the print head into separate segments and feeding inks suitable for the original, the construction of the color print head can be made compact and its production costs can be reduced.

One construction of a print head and a text/graphics printing unit incorporated in a recording unit comprises a transparent electrode formed on a transparent substrate, a photoconductive film formed on the transparent electrode, means for feeding ink onto the photoconductive film and a facing electrode which are arranged in this order, wherein the means for feeding the ink and the facing electrode are located with a sufficient clearance therebetween to allow recording paper to be inserted. The construction further comprises a power source for applying a voltage between the transparent electrode and the facing electrode. This construction produces the following effect.

(14) The amount of electric charge accumulated in the ink on the print head can be altered by controlling input light energy from the original image illuminating means. This makes it possible to increase the ink squirting speed and vary it depending on the type of recording medium.

Another construction of a print head and a text/graphics printing unit incorporated in a recording unit comprises a transparent electrode formed on a transparent substrate, a photoconductive film formed on the transparent electrode, means for feeding ink onto the photoconductive film, a slit plate having a slit for controlling a burst of ink and a facing electrode which are arranged in this order, wherein the means for feeding the ink and the facing electrode are located with a sufficient clearance therebetween to allow recording paper to be inserted. The construction further comprises a power source for applying a voltage between the transparent electrode and the facing electrode. This construction produces the following effects.

(15) Nozzles are not required for individual pixels of an image in the print head or in the text/graphics printing unit. A slit structure formed by the slit plate provides high resolution and low production costs and facilitates cleaning after ejection of the ink.

(16) Provision of the slit plate helps control the ink squirting direction and stabilize the amount of squirted ink and squirting speed depending on the distance between the slit plate and the recording paper. It is also possible to increase ink concentrating efficiency and reduce energy required for producing bursts of the ink by further controlling the curvature of the ink meniscus.

Another construction of a print head and a text/graphics printing unit incorporated in a recording unit comprises a transparent electrode formed on a transparent substrate, a photoconductive film mounted on the transparent electrode, the photoconductive film having a projection formed of a wall for controlling a burst of ink, means for feeding ink into the projection on the photoconductive film, and a facing electrode which are arranged in this order, wherein the means for feeding the ink and the facing electrode are located with a sufficient clearance therebetween to allow recording paper to be inserted. The construction further comprises a power source for applying a voltage between the transparent electrode and the facing electrode. This construction produces the following effect.

(17) Formed on the photoconductive film as a projecting part, the wall performs the function of the earlier-mentioned slit plate. By controlling the amount of squirted ink, the wall serves to provide high resolution and low production costs.

In still another construction of a print head and a text/graphics printing unit incorporated in a recording unit, the print head comprises ink accelerating means for accelerating squirted ink. This construction produces the following effects.

(18) The accelerating means significantly increases the ink squirting speed, enabling high-quality, high-speed image reproduction.

(19) Since the ink can be squirted by the accelerating means alone, it is possible to achieve a compact system configuration.

(20) As no voltage is applied to a facing electrode located on the back of recording paper, paper feeding errors caused by an electrostatic force exerted by the recording paper can be avoided, and the level of torque exerted by paper feeding means can be reduced.

(21) Since the print head is formed into a linear shape, its printable width can be matched with the size of the recording paper and the recording speed is remarkably increased, enabling high-speed printing.

A recording system of one construction comprises one of the aforementioned recording units, an image processing circuit which takes in image data from an external device and processes it, recording paper, paper feeding means for feeding the recording paper into the recording unit, a power source, and a controller for controlling the recording unit, the paper feeding means, the power source and the image processing circuit. This construction produces the following effects.

(22) Based on ink-jet technology, it is possible to configure a color copying system combining high-speed recording capability of the continuous type and compactness of the on-demand type in which the amount of squirted ink supply is controlled by a recording unit.

(23) It is possible to achieve high resolution comparable to the electrophotographic technology by using the ink-jet technology in color copying application.

(24) System configuration for the color copying application can be made simple and inexpensive compared to the electrophotographic technology.

What is claimed is:

1. A recording unit comprising: illuminating means for projecting light on the whole of an original to form an original image which corresponds to the entire original; optical means for focusing the original image formed by the illuminating means; a light control plate having a slit for allowing a portion of the original image focused by the optical means to pass through; and a print head for ejecting ink on a recording paper in accordance with the light passing through the slit of the light control plate.

2. A recording system comprising: a recording unit as set forth in claim 1; paper feeding means for feeding the recording paper to the recording unit; an image processing circuit for processing image data of the original image; and a controller for controlling the recording unit, the paper feeding means and the image processing circuit.

3. A recording unit comprising: illuminating means for projecting light on an original to form an original image; optical means for focusing the original image formed by the illuminating means; optical sensing means for detecting light of the original image focused by the optical means and converting the original image into an electrical signal by photoelectric conversion; light projecting means for projecting light in accordance with an output signal of the optical sensing; means corresponding to the electrical signal; and a print head for ejecting ink on a recording paper in accordance with the light projected from the light projecting means.

4. A recording system comprising: a recording unit as set forth in claim 3; paper feeding means for feeding the recording paper to the recording unit; an image processing circuit for processing image data of the original image; and a controller for controlling the recording unit, the paper feeding means and the image processing circuit.

5. A recording system comprising: illuminating means for projecting light on an original to form an original image; optical means for focusing the original image formed by the illuminating means; color separation means for separating light from the original image or a focused light thereof into individual light portions having different colors; and a plurality of print heads for ejecting ink on a recording paper in accordance with respective individual light portions of the light separated by the color separation means. each of the print heads being provided at least with ink having a color corresponding to one of the colors of the individual light portions of the light separated by the color separation means.

6. A recording system comprising: a recording unit as set forth in claim 5; paper feeding means for feeding the recording paper to the recording unit; an image processing circuit for processing image data of the original image; and a controller for controlling the recording unit, the paper feeding means and the image processing circuit.

7. A recording unit comprising: illuminating means for illuminating an original to form an image of the original; optical means for focusing the image of the original formed by the illuminating means; optical sensing means for detecting light of the image of the original focused by the optical means; light projecting means for projecting light in accordance with an output signal of the optical sensing means; and at least one print head for ejecting ink on a recording medium in accordance with the light projected by the light projecting means to reproduce the image of the original on the recording medium.

8. A recording unit according to claim 7; further comprising light control means for receiving the image of the original focused by the optical means and for projecting the image of the original on the optical sensing means.

9. A recording unit according to claim 8; wherein the light control means comprises a control plate having a slit through which the image of the original passes for projection on the optical sensing means.

10. A recording system comprising: a recording unit as set forth in claim 7; feeding means for feeding the recording medium to the recording unit; an image processing circuit for processing image data of the original image; and a controller for controlling the recording unit, the paper feeding means and the image processing circuit.

11. A recording system comprising: a recording unit as set forth in claim 8; feeding means for feeding the recording medium to the recording unit; an image processing circuit for processing image data of the original image; and a controller for controlling the recording unit, the paper feeding means and the image processing circuit.

12. A recording system comprising: a recording unit as set forth in claim 9; feeding means for feeding the recording medium to the recording unit; an image processing circuit for processing image data of the original image; and a controller for controlling the recording unit, the paper feeding means and the image processing circuit.

* * * * *